United States Patent [19]
Parker et al.

[11] Patent Number: 4,947,928
[45] Date of Patent: Aug. 14, 1990

[54] VAV SYSTEM COORDINATOR

[75] Inventors: Edward Parker; Jeffrey L. Parker, both of Jacksonville, Fla.

[73] Assignee: Carrier Corporation, Syracuse, N.Y.

[21] Appl. No.: 284,601

[22] Filed: Dec. 15, 1988

[51] Int. Cl.⁵ .......................... F24F 3/00; F24F 7/00
[52] U.S. Cl. ...................................... 165/22; 236/44.3
[58] Field of Search .................... 236/49.3; 165/22; 364/557, 505

[56] References Cited

U.S. PATENT DOCUMENTS

| | | | |
|---|---|---|---|
| 3,951,205 | 4/1976 | Zilbermann | 165/22 X |
| 4,187,543 | 2/1980 | Healey et al. | 165/22 X |
| 4,530,395 | 7/1985 | Parker et al. | 236/49.3 |

Primary Examiner—William E. Wayner
Attorney, Agent, or Firm—Arthur G. Yeager

[57] ABSTRACT

A microcomputer-based system coordinator for variable air volume (VAV) system through which conditioned air is supplied to a plurality of zones. The VAV system coordinator (VSC) is used to coordinate a central system VAV cooling and heating operation based on the zone requirements of its associated slave thermostats and fan box monitors. The VSC is used as a slave VSC which receives information from zone thermostats and fan box monitors and communicates with a master VSC which is used for overall system coordination. The VSC also receives information from temperature and humidity sensors and the real time for use in system operation.

84 Claims, 5 Drawing Sheets

VAV SYSTEM COORDINATOR

RELATED U.S. APPLICATIONS

The following copending applications are to be considered herein:

Thermostat, Ser. No. 013868, Filed Feb. 1, 1987; now U.S. Pat. No. 4,884,214.

Thermostat Control System, Ser. No. 013869, Filed Feb. 12, 1987; now U.S. Pat. No. 4,843,084.

Method and System For Controlling A Single Zone HVAC Supplying Multiple Zones, Ser. No. 013870, Filed Feb. 12, 1987; now abandoned.

Bypass Controller And Bypass System, Ser. No. 064540; Filed June 22, 1987; now U.S. Pat. No. 4,829,447.

Fan-Powered Mixing Box Assembly, Ser. No. 176,461 Filed Apr. 1, 1988.

BACKGROUND OF THE INVENTION

1. Field of the Invention

The present invention relates to apparatus and methods for use in coordinating the operation of heating, ventilation, and air conditioning (HVAC) units in variable air volume (VAV) systems.

2. Prior Art

The present invention relates to microcomputer based control systems used in variable air volume (VAV) systems. Typically, large HVAC units supply conditioned air to the various zones which may or may not have individual zone dampers. As various zone dampers modulate closed because the zone demands have been met, as established by a local thermostat, the air flow through the remaining dampers will increase. Methods of accommodating the additional and often excessive air flow; that can result consist generally of air control systems such as discharge dampers and variable speed fans as explained in the copending application "Fan-Powered Mixing Box Assembly", these difficulties and others can be overcome by treating each of several large fan-powered mixing box assemblies as though it were a separate HVAC unit operated by a microcomputer-controlled monitor with zone dampers controlled via VVT monitorstats as described in the related U.S. Applications identified above. However, central HVAC units are still required because the fan-powered mixing box assemblies have no independent source of cooling and the economics of scale argue in favor of central heating sources.

The present invention discloses a microcomputer-controlled VAV system coordinator (VSC) which can be configured to operate as three different application specific types of VSCs: (1) as a VSC used as part of an electronic VAV system to coordinate the central system VAV cooling and heating operation based on the zone requirements of its associated slave thermostats and fan box monitors; (2) as a slave VSC as part of an electronic VAV system to communicate and store information from its associated slave thermostats and fan box monitors and supply the information to the associated master VSC for overall system coordination; and (3) as a master VSC coordinating central heating and cooling based upon zone information received from its associated slave VSCs.

The present invention provides base of operation and maintenance and a degree of zone control and system coordination for superior to prior art VAV systems employing fan-powered mixing boxes.

SUMMARY OF THE INVENTION

In accordance with the present invention, there is provided in a system for monitoring and controlling the condition of air in each of a plurality of zones when using a unit having a fan to supply heated or cooled conditioned air to each zone via a main duct and secondary ducts through a zone damper means in zone ducts communicating with each zone and operated by a damper control means, at least one zone having zone heating means controlled by a respective damper control means, the improvement comprising programmable system controller means for controlling and coordinating the operation of said unit with said damper control means and respective said zone damper means and respective said zone heating means. The system controller means receives information from each damper controller means, and from means for determining the condition of air in each zone. The system controller means operates the unit in accordance with its programming, the condition of air in each zone and in accordance with information received from each damper controller means to control the unit in preselected allowable modes during distinct time periods.

Various aspects are seen herein with the damper controller means includes a zone thermostat and the means for determining the condition of air in each zone includes a first sensor for determining the temperature of the air in its respective zone, the first sensor providing electrical signals to the thermostat indicative of the temperature of the air in respective zone. The thermostat also includes means for establishing the desired temperature in respective zone. The system controller also receives data indicative of the real time.

The system also includes at least one fan-powered mixing box assembly in a secondary duct controlled by a mixing box control means for supplying heated or cooled conditioned air to a plurality of second zones, mixing box control means receiving information for determining the condition of the air in each second zone and the demand for heating or cooling in all second zones and selecting the heating or cooling mode of the fan-powered mixing box. The system controller means has a first program for operating the unit such that the unit is to be operated only in the cooling mode during a first preselected time period, operated in the heating or cooling mode during a second preselected time period, and operated only in the heating mode during a third preselected time period. The system controller means further has a second program for determining, in the first preselected time period, the number of zones having a demand for cooling and defining such zones as first cooling callers, and determining if any fan-powered mixing box has been selected to operate in the cooling mode during the first preselected time period. The second zones of the corresponding fan-powered mixing box that are demanding cooling are defined as second zone cooling callers. If the total number of the first and second zone cooling callers equals or exceeds a preselected number defining the system mode demand number the system controller means selects the cooling mode of the unit and provides output signals to the zone thermostats and the mixing box control means indicative of the selected mode of the unit. The system controller means thereafter activates the unit in the selected mode until all zones, including the second zones, demanding the selected mode of the unit have been substantially satisfied and then deactivates the unit. The system controller means has a program for determining, during the second preselected time period, the number of zones having a demand for heating or cooling and defining such zones as zone heating or zone cooling callers, respectively, and determining if any fan-powered mixing box has been selected to operate in either the heating or cooling mode during the second preselected time period. Each second zone of a corresponding fan-powered mixing box that is demanding a mode coincident with the operating mode of such respective fan-powered mixing box being defined as a second zone heating or cooling caller, respectively, and if the total number of the first and second zone heating or cooling callers equals or exceeds a preselected number defining the system mode demand number the system controller means selects the corresponding heating or cooling mode, respectively, of the unit and provides output signals to the zone thermostats and the mixing box control means indicative of the selected mode of the unit. The system controller means thereafter activates the unit in the selected mode until all zones, including the second zones, demanding the selected mode of the unit have been substantially satisfied and then deactivates the unit. The system controller means also has a program for determining, during the third preselected time period, the number of zones having a demand for heating and defining such zones as zone heating callers and determining if any fan-powered mixing box has been selected to operate in the heating mode during the second preselected time period, the second zones of the corresponding operating fan-powered mixing box that are demanding heating being defined as second zone heating callers, such that if the total number of the first and second zone heating callers equals or exceeds a preselected number defining the system mode demand number, the system controller means selects the heating mode of the unit and provides output signals to the zone thermostats and the mixing box control means indicative of the selected mode of the unit. The system controller means thereafter activates the unit in the selected mode until all zones having zone callers, including the second zones, demanding the selected mode of the unit have been substantially satisfied and then deactivates the unit.

Additional aspects are provided by the system controller means monitoring all zone callers, including the second zones, during each preselected time period and selects the respective zone caller with the greatest demand as a reference zone and activates the unit in the respective heating or cooling mode until the reference zone is substantially satisfied. The system controller means periodically determines the demand from all zone callers and, if the demand in another zone having a demand coincident with the selected mode of the unit is greater than the reference zone, the other zone is selected as a new reference zone and the unit is operated until demand in the new reference zone is substantially satisfied. The system controller means has another program such that when cooling demand in the reference zone exceeds a first predetermined value during the first time period the system controller means will provide an output signal to the unit for increasing the cooling supplied to the reference zone by the unit. The system controller means also has a program for monitoring the temperature trend in the reference zone such that the system controller means will not provide an output signal to the unit for increasing the cooling supplied to the reference zone when the temperature trend in the reference zone indicates that the cooling demand of the reference zone is being substantially satisfied. The system controller means has an additional program such that when the respective heating or cooling demand in the reference zone exceeds a first predetermined value during the second or third time period, the system controller means will provide an output signal to the unit for increasing the respective heating or cooling supplied to the reference zone by the unit.

The temperature trend in the reference zone is also monitored during the second and third time periods and the system controller means will not provide an output signal to the unit for increasing the respective heating or cooling supplied to the reference zone when the temperature trend indicates that the demand in the reference zone is being substantially satisfied. In the second time period, if the total number of first and second zone callers demanding cooling is equal to the total number of first and second zone callers demanding heating and each such number equals or exceeds the system mode demand number, the system controller means selects the heating or cooling mode coincident with the demand of the zone having the greatest demand, such zone being selected as a reference zone.

In accord with another aspect of the present invention, the programmable system controller means includes at least one programmable slave system coordinator and a programmable master system coordinator, the slave system coordinator receiving information from the damper controller means and receiving information indicative of the condition of air in each zone, and supplying such information to the master system coordinator, the master system coordinator operating the unit in accordance with its programming and the information received from the slave system coordinator to control the unit in the heating or cooling mode. The master system coordinator has a program means such that the allowable operating mode of the unit is the cooling mode only during a first preselected time period, is the heating or cooling mode during a second preselected time period, and is the heating mode only during a third preselected time period. The master system coordinator determines the demand for heating or cooling from all the zones and the number of zones demanding heating or cooling during each preselected time period by receiving such information from the slave system coordinator and compares such number with a preselected number defining the system mode demand number for operating the unit in a demanded allowable mode during a preselected time period if the number of zones demanding an allowable mode equals or exceeds the system mode demand number.

In this aspect of the present invention, the system further includes at least one fan-powered mixing box controlled by a mixing box control means for supplying heated or cooled conditioned air to a plurality of second zones, the mixing box control means receiving information for determining the condition of the air in each second zone and the demand for heating or cooling in all second zones and selecting the heating or cooling mode of the fan-powered mixing box and providing such information to the slave system coordinator. The master system coordinator has a program such that when the fan-powered mixing box is being operated in either the heating or cooling mode, the number of second zones having a demand coincident with the mode of the fan-powered mixing box is provided to the slave system coordinator. The master system coordinator determines the total number of zones, including the second zones, demanding an allowable operating mode of the unit by receiving such information from the slave system coordinator and then compares such number with the system mode demand number for operating the unit in a demanded allowable mode if the total number of zones demanding an allowable mode equals or exceeds the system mode demand number. The master system coordinator also has a program for determining the zone, including said second zones, having the greatest demand coincident with a selected allowable operating mode of said unit, said zone with the greatest demand being selected by said master system coordinator as a reference zone and operating the unit in the selected mode until the demand in the reference zone is substantially satisfied.

In accord with the present invention, there is provided a method for monitoring, controlling and coordinating the operation of a system which includes a central heating and cooling unit for supplying a plurality of zones with heated or cooled conditioned air via zone duct damper means controlled by respective damper control means wherein the system further includes at least one fan-powered mixing box operated by respective mixing box control means for supplying heated or cooled conditioned air to a group of the zones and further includes at least one zone having supplemental heating means operated by respective damper control means, wherein a programmable slave system coordinator receives information from the damper control means and the mixing box control means indicative of the condition of the air in each zone and operating mode of each fan-powered mixing box, and wherein a programmable master system coordinator receives such information from the programmable slave system coordinator to operate the central heating and cooling unit in preselected allowable modes during distinct time periods comprising the steps of: (A) determining the zone demand for heating or cooling from all damper control means by the slave system coordinator; (B) determining the number of zones having a demand for heating or cooling from all damper control means by the slave system coordinator; (C) determining by the slave system coordinator if any fan-powered mixing box is being operated in the heating or cooling mode and the demand of and number of zones associated with an operating mixing box that are demanding the selected mode of such mixing box; (D) selectively preselecting by the master system coordinator the total number of zones having a demand for heating or cooling that is necessary to activate the central unit in an allowable mode; (E) comparing the numbers obtained from steps B and C by the master system coordinator and selecting the desired allowable mode when the total of the number of zones having a demand for heating or cooling respectively, as obtained in steps B and C is equal to or greater than the number selected in step D; (F) activating the central unit by the master system coordinator in the selected mode until all zones demanding the selected mode have been satisfied; (G) deactivating the central unit by the master system coordinator; and (H) repeating steps A–G for the other mode when demand for the other mode has been selected in accord with steps A–E. The method further comprising the step of: (I) comparing the number of demands after steps A–D and if the demands for heating and cooling are equal, and if both heating and cooling modes are allowable during the preselected time period, the central unit will be activated in step F in the mode coincident with the demand of the zone with the greatest demand. Step F also includes the step of: (I) choosing by the master system coordinator the zone demanding the selected mode as the reference zone and activating the central unit until the demand of the reference zone is substantially satisfied. Step I further includes the step of: (J) selecting by the master system coordinator a second reference zone if the demand in a second zone is of the same mode and if it exceeds the demand in the reference zone selected in step I and monitoring by the master system coordinator the demand of the reference zone and increasing the heating or cooling being supplied by the central unit if the demand in the reference zone exceeds a predetermined value established by the master system coordinator; and step J further includes the step of: (K) monitoring by the master system coordinator of the temperature trend in the reference zone and not increasing the heating or cooling supplied by the unit if the temperature trend in the reference zone indicates that the demand of the reference zone is being substantially satisfied.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT OF THE INVENTION

Introduction

As buildings become larger with more partitions and different use-areas, performance of heating, cooling, and air conditioning systems that treat a large space as a single zone become inadequate. Many large buildings will utilize variable air volume (VAV) systems which generally require separate supplementary heat systems for perimeter areas.

VAV system may employ a combination of zone thermostats and fan-powered mixing boxes for augmented heating. The fan-powered mixing boxes are controlled by devices such as a fan-box monitor and are in communication with both master and slave thermostats. A variable air volume system coordinator (VSC) operates to coordinate and control the heating and cooling units in the system and all thermostats and/or fan-powered mixing boxes/fan-box monitors associated therewith. Finally, multiple VSC units may be used in master-slave relationship for large systems if the circumstances so require.

Figure 1:
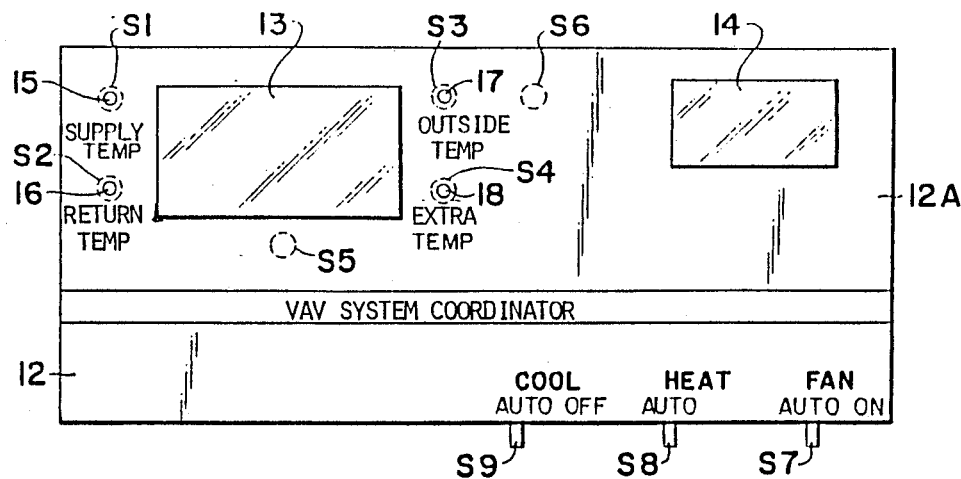
FIG. 1 is a front elevational view of the variable air volume system coordinator (VSC) in accord with the present invention
Figure 2:
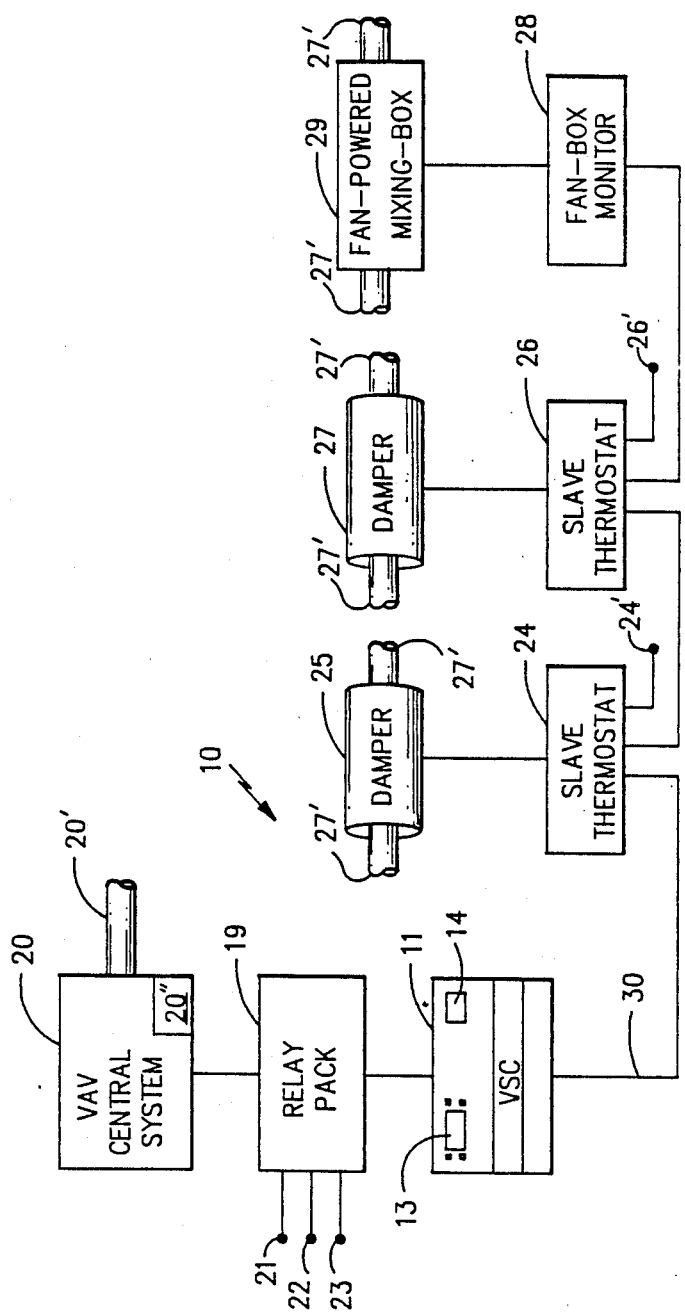
FIG. 2 is a block diagram of a VAV system employing the VSC in accord with the present invention.

Referring now to the drawings, a typical VAV system is illustrated in FIG. 2 and depicted by the numeral 10. The VAV system coordinator (VSC) 11 is shown illustrating its relative placement. As illustrated in FIG. 1, the VSC 11 has a housing 12 with removable front cover 12A, a liquid crystal Display 13, a real time clock 14 and four resilient portions 15-18 respectively for operating switches S1-S4 which are located below cover 12A. The electronic circuitry in the VSC 11 is substantially identical in all respects to the electronic circuitry employed in the monitor thermostats disclosed in our first three copending applications identified above. The VSC 11 employs a conventional microcomputer with internal memory supplemented by programmable logic consisting of an electronically erasable prom (EEPROM) and a ROM which contains instruction codes and fixed data. Switches S5 and S6 are used for programming the microprocessor circuitry as will be discussed herebelow.

VSC 11 is wired to a relay pack 19 which has three temperature sensors: supply air temperature sensor 21; return air temperature sensor 22; and outside air temperature sensor 23. VAV central system 20 represents a conventional VAV system which provides heated and cooled conditioned air to the various zones throughout the system. In the particular system illustrated in FIG. 2, two slave thermostats 24, 26 control air flow to their respective zones via dampers 25 and 27. A fan-box monitor 28 controls a fan-powered mixing box 29 which, as described in our copending application, supplies air to zones controlled by dampers such as 25 and 27 and monitor 28 may include additional slave thermostats (not shown) in its system. The illustration of FIG. 2 is only representative of a given application and it is understood that a particular VAV system may contain many thermostats and fan box monitors.

The VSC 11 is in electrical communication with slave thermostats 24 and 26 and fan box monitor 28 via communication bus 30.

Figure 3:
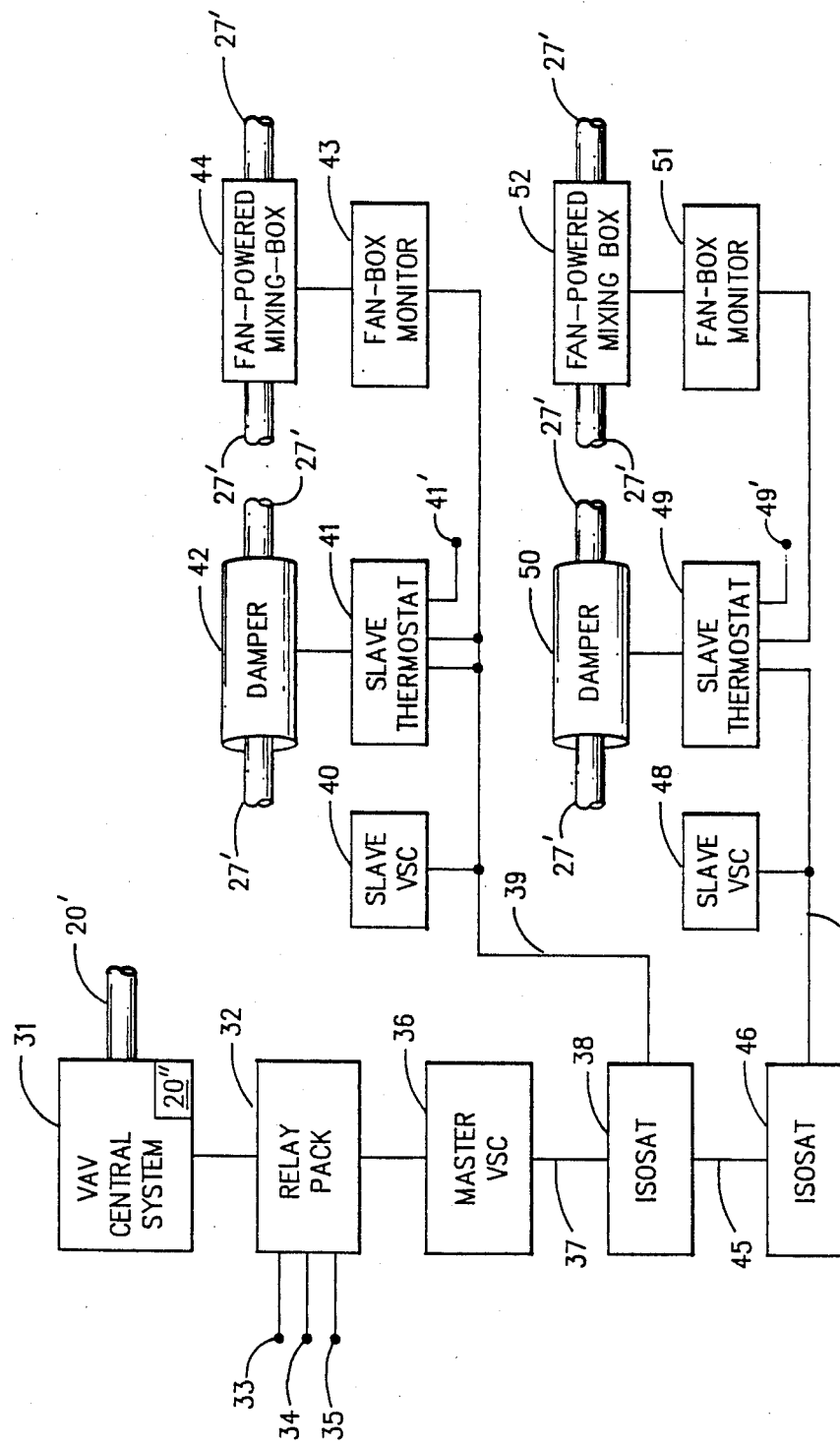
FIG. 3 is a block diagram of a VAV system employing multiple VAV system coordinators in a master-slave relationship.

In FIG. 3 a VAV system is illustrated employing a central VAV system 31 which is connected to a relay pack 32 having supply air temperature sensor 33, return air temperature sensor 34 and outside air temperature sensor 35 wired thereto. The relay pack 32 is connected to a master VSC 36 which is connected via communications bus 37 to an Isolation Satellite (ISOSAT) used to connect communications bus 39 to bus 37. Slave VSC is also on communications bus 39 and is shown in communication with a slave thermostat 41 controlling damper 42, and fan-box monitor 43 which controls fan-powered mixing box 44. In FIG. 3, a general system is illustrated having a second ISOSAT 46 connected via bus 45 to the first ISOSAT 38. A second communications bus 47 supports a second slave VSC 48 and second slave thermostat 49/damper 50 and fan-box monitor 51/fan-powered mixing box 52 combinations.

The drawings illustrate a typical system that employs a standard VAV system 20 with main duct 20' and a fan 20''. The zones are supplied by a plurality of secondary ducts 27'. The slave thermostats 24, 26, 41, 49 preferably include zone temperature sensors 24', 26', 41', 49', respectively, which are physically positioned where appropriate in a given system.

Figure 2A:
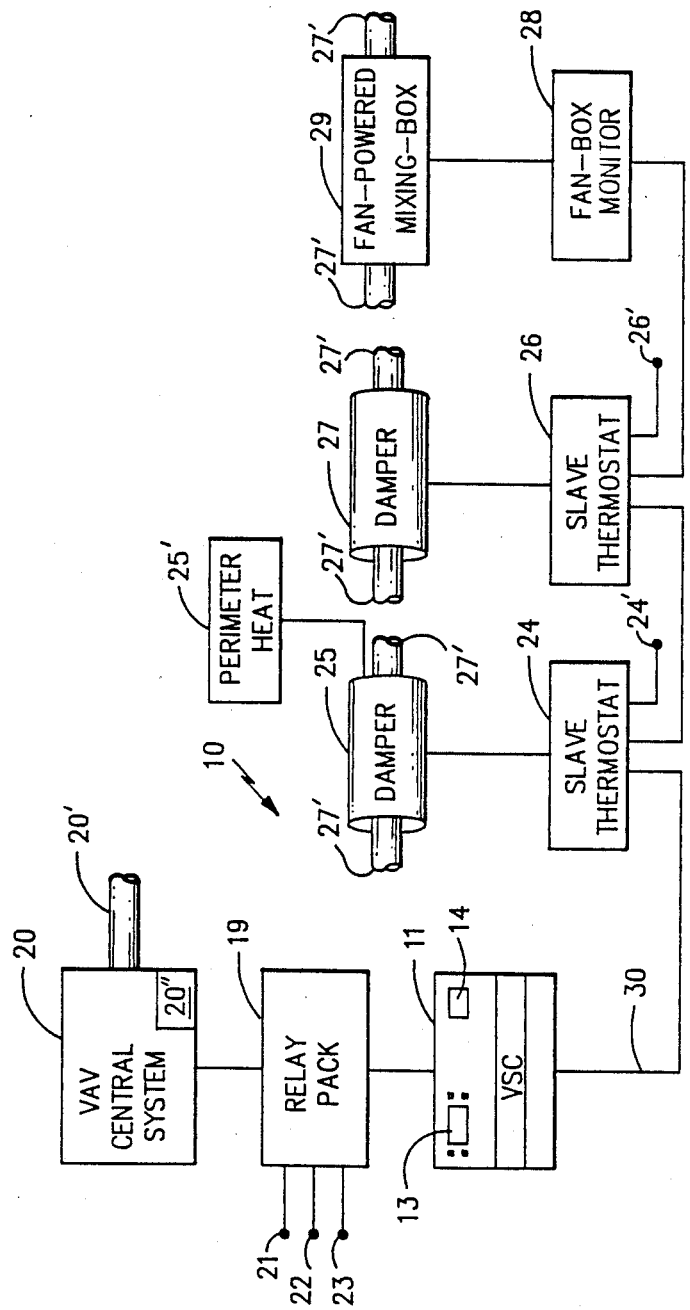
FIG. 2A is a block diagram of another VAV system employing the VSC in accord with the present invention.
Figure 2B:
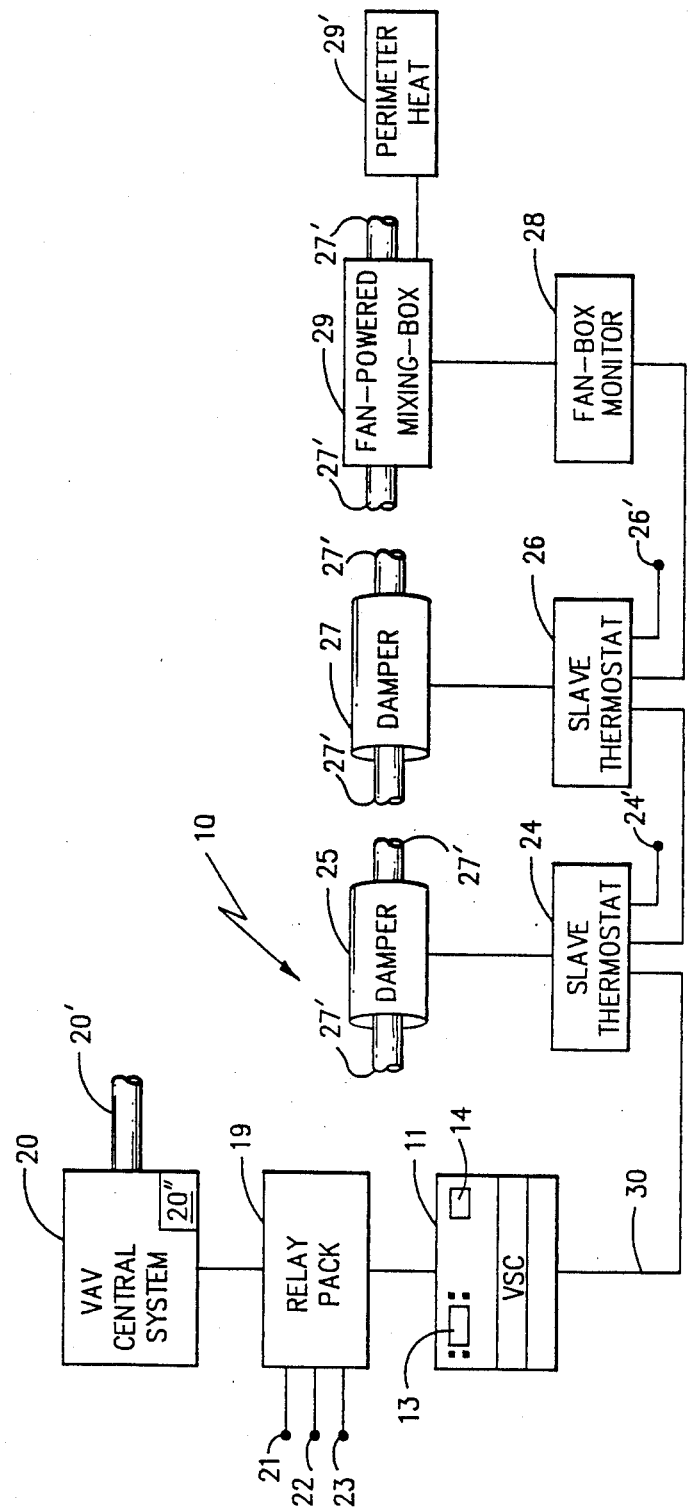
FIG. 2B is a block diagram of a third VAV system employing the VSC in accord with the present invention.

In FIGS. 2A and 2B, variations of a standard VAV system are illustrated each employing a VSC 11 in accord with the present invention. FIG. 2A illustrates that applications of a VAV system will often warrant the use of a supplemental heat source such as perimeter heat 25' which includes baseboard heaters and the like. Perimeter heat 25' will be controlled by the associated slave thermostat 24, 26 or 28 for each zone where they are installed. FIG. 2B illustrates that supplemental heat sources may include perimeter heat 29' in zones augmented by a fan-powered mixing box 29 which, in turn, is controlled by a fan-box monitor 28.

The three variations of a VAV system illustrated in FIGS. 2, 2A and 2B describe the flexibility inherent in VAV systems. In the present discussion, VAV central unit 20 or 31 is described as including both a central cooling capability and a central heating capability. Such a central unit 20 or 31 is not an absolute requirement, however, and in generally moderate climates, perimeter heat 25' or 29' used with fan-powered mixing box 29 may be sufficient to supply the entire heating requirements of a given building. In such a case, VAV central unit 20 or 31 may be limited to a cooling-only unit. Furthermore, if central system heating becomes necessary for whatever reason, the VSC 11 has sufficient programming capability that an add-on heating unit could be attached to central system unit 20 or 31 with very little effort required as will be apparent from the discussion of the programming and operation of the VSC 11 given hereinbelow.

The software for the operation and programming of a VSC 11 is included as Appendix "A".

Operating Modes

Generally speaking, the present system contemplates a central VAV system such as units 20 or 31 that supplies only cool air to a building during the day—the "comfort mode" during the VAV cooling time period—and supplies either cooling or heating during the setback time period. Supplemental heat can also be used during the morning warm-up time period along with central system heat to attain the desired temperature in the building prior to the VAV cooling time period.

VAV Cooling Time Period

During the occupied daylight periods when the VSC 11 is in the comfort mode, the VSC 11 checks the zone and system demand to determine whether cooling should be selected. The zones demanding cooling are defined as "zone callers". If a fan-box monitor 28 has selected the cooling mode based upon the demand of its associated zones, the zones associated with the fan-powered mixing box 29 that have a demand coincident with the operating mode selected by monitor 28 are defined as "system callers". If the number of zone callers plus system callers demanding cooling equals or exceeds a preselected system mode demand number, the unit 20 or 31 will be activated in the cooling mode. The zone, including a system caller, that has the greatest demand will be selected and the unit 20 or 31 will operate in the cooling mode until demand in the reference zone is less than 0.5° F. A new reference zone can be selected any time a particular VSC scans the system (about every 20 seconds).

VAV Setback Time Period

In the setback time period, usually after normal working hours, the heating or cooling mode can be selected based again on the system mode demand number. However, if an individual slave thermostat 24, 26, 40 or 48 or fan-box monitor 28, 43 or 51 is in setback, then the particular zones cannot be considered zone or system callers, respectively. If an equal number of zone and system callers are demanding both heating and cooling, the mode that matches the zone caller having the greatest demand will be selected. A reference zone will be selected, as before.

A slave thermostat 24 or 26 that has energized an associated supplemental heat source can be considered a heating caller. The central system unit fan can also be energized if supplemental heat is used.

Morning Warm-Up Time Period

A morning warm-up mode will be used for a given time period prior to the initiation of the VAV cooling mode time period. This mode can utilize supplemental heat if so selected. The system mode demand number is used as before except that only the heating mode can be selected during this time period.

In all time periods, the temperature trend in the reference zone can be monitored and a temperature trend staging option can be used to minimize use of second stage heating or cooling to make operation of the unit 20 or 31 more economical.

In FIG. 2, VSC 11 is used as a "single VSC" to coordinate the heating and cooling supplied by VAV central system 20 based on the zone requirements of its associated slave thermostats 24 and 26 and fan-box monitor 28.

In FIG. 3, a VSC can be used as a "slave VSC" such as 40 and 48 and as a "master VSC" such as 36. The slave VSC 40 and 48 is used to communicate with and store zone information from its associated zone thermostats 41 and 49 and fan-box monitor 43 and 51. This information is supplied via buses 39 and 47 to the master VSC 36 which coordinates the VAV central system 31 cooling and heating operation based on zone information received from the slave VSCs 40 and 48.

Relay packs 19 and 32 are used to control the VAV control systems 20 and 31, respectively, and provide for interfacing with the various temperature sensors. ISO-SATS 38 and 46 are communication bridges used to connect the various buses that utilize different, but industry standard, electronic interconnection standards as is understood in the art.

In normal operation resilient portions 15-18 can be depressed to read the associated data as indicated thereon.

A description of the programming and operation of the VSC 11 will illustrate the unique features of the invention. The following description is directed generally to the single VSC 11 illustrated in FIG. 2 although some of the programming features are specifically relevant only to a slave VSC 40 or 48 or master VSC 36 as illustrated in FIG. 3.

PROGRAMMING THE VSC

Configuration Display

The VSC 11 has two categories of programmable functions. The first category involves those functions that are programmed by the installer and consists of system configuration, sensor calibration, and initialization of various parameters. The second category of functions involves those chosen by the user and include time-of-day programming for setback times and similar operations. The configuration displays utilize switches S1-S5 and Display 13 for adjustment of installer-programmable functions and S6 is used for user-programmable time periods.

Configuration Display No. 1

In "Config. 1", two separate numbers are displayed on Display 13. The two-digit number in the upper left-hand portion of Display 13 is adjusted upward via switch S1 and lowered via switch S2. The two-digit number in the lower right-hand portion of the Display 13 is adjusted upward via switch S3 and lowered via switch S4.

Configuration Display No. 2

In "Config. 2", one number is displayed on Display 13 and may be 4 digits in length with the two most significant digits in the upper left-hand portion and the two least significant digits in the lower right-hand portion. This number can be adjusted upward using either switch S1 or S3 and lowered using either switch S2 and S4.

Configuration Display No. 3

In "Config. 3", one two-digit number or letters is displayed in the upper left-hand portion of Display 13 and is adjusted upward using switch S1 or S3 and lowered via switch S2 or S4.

Configuration Display No. 4

In "Config. 4", one two-digit number is displayed in the upper left-hand portion of Display 13 and an ON/OFF annunciator displayed in the upper right-hand corner. S1 and S2 are used to raise and lower the number. Switches S3 and S4 are used to toggle the annunciator ON or OFF. In Config. 4, switch S5 is always in position "F" and function "F1" is enabled by placing "01" on Display 13. All other functions "F2" to "F11" are enabled in the same manner.

PROGRAMMING IN CONFIG. 1

1. High Temperature Limits

Supply air temperature is monitored via temperature sensor 21. When supply air temperature exceeds a 1st or 2nd Stage High Temperature Limit Setpoint the corresponding stage of heating is disabled when the central system 20 is in the heating mode. Switch S5 is placed in position "A" and two numbers are indicated on Display 13. In the upper left-hand corner the 1st stage temperature limit is visible and is adjusted via S1 and S2. The 2nd stage temperature limit is visible in the lower right-hand portion of Display 13 and is adjusted via S3 and S4. The range of the setpoints is 105°-175° F. in 5 degree increments. The most significant digit is always "1" and is therefore omitted from the Display 13. Either high temperature limit can be disabled by setting the setpoint to 0° F.

PROGRAMMING IN CONFIG. 2

2. Supplemental Heat Lockout Temperature Setpoint

When the outside air temperature as measured by outside air temperature sensor 23 is above the Supplemental Heat Lockout Temperature Setpoint, supplemental heat is not available to slave thermostats 24, 26, and fan-box monitor 28 associated with the system controlled by a given VSC 11. When S5 is placed in position 5, switches S1-S4 are used to adjust the setpoint from 5°–120° F. in 5 degree increments. 3. Morning Warm-Up Time Limit The Morning Warm-up Time Limit establishes the amount of time the VSC 11 operates in the morning warm-up mode prior to the start of the VAV system cooling mode. With S5 in position "2", the time is displayed in hours (upper left portion) and minutes (lower right portion) from 0 to 9 hours 55 minutes and adjusted in 5 minute intervals using switches S1–S4. This function can be disabled by setting the time to "0" hours/minutes. 4. Supply Air Temperature Sensor Calibration Supply air temperature sensor 21 is calibrated by placing S5 in position "7" and adjusting the temperature on Display 13 in 1/10° F. increments using S1–S4 to match the temperature that is indicated on a reference thermometer. The sensor 21 is originally calibrated by the manufacturer.

5. Return Air Temperature Sensor Calibration

The return air temperature sensor 22 is calibrated by placing S5 in position "8". The displayed temperature is adjusted using S1–S4 to match the temperature displayed on a reference thermometer. Temperature on Display 13 is displayed in 1/10° F. increments. 6. System Heating Mode Lockout When outside air temperature as measured by outside air temperature sensor 23 is above the system heating mode lockout setpoint, the VSC 11 cannot select the heating mode of the central system 20 or 31. In addition, VSC 11 will deactivate the heating mode if outside air temperature exceeds this value. This setpoint is established by switches S1–S4 in 5° F. increments with switch S5 in position 6.

PROGRAMMING IN CONFIG. 3

7. Warm-Up Heat Source

The Warm-up Heat Source function is used to determine the heating sources that are available during the Morning Warm-up Time period. With S5 in position "3", the upper left-hand portion of Display 13 will contain CS or C. CS indicates that the VSC 11 has zone supplemental heat available as well as heat from central system 20. C indicates that zone supplemental heat is disabled and that only central system heat is available. Any switch S1–S4 can be used to toggle between CS and C as desired.

8. Setback Heat Source

The Setback Heat Source function determines the heating sources that are available during the Setback Time period. When S5 is placed in position "4", the upper left-hand portion of Display 13 will show one of three modes of setback heat source availability: (1) S; which indicates zone supplemental heat is available, central heating is disabled; (2) CS; both supplemental heat and central system heat is available; or (3) C; indicating central system heat is available and supplemental heat is disabled. S, CS, or C can be displayed by pressing switches S1–S4 and toggling the desired mode onto Display 13.

9. System Mode Demand

System Mode Demand establishes the minimum number of zone callers and the number of system callers associated with an operating fan-powered mixing box that must exist before the VSC 11 can select a central system heating or cooling mode. In position "9" of S5, a single number from "1" to "20" is displayed in the upper left-hand portion of Display 13. The number can be adjusted in increments of "1" via switches S1 and S2.

10. System Type

The VSC 11 can be configured to function as a single VSC, slave VSC, or a master VSC. With S5 in position "B", switches S1 a S2 are used to set the number displayed in the upper left-hand corn of Display 13 to "1" for single VSC; "2" for slave VSC; or "3" for master VSC.

PROGRAMMING IN CONFIG. 4

11. Time Guard Override

When the Time Guard Override is ON, the VSC's heating/cooling time guard and setback time guard are set at 30 seconds. When the override function if OFF, the length of each respective time guard is determined by a mathematical relationship based upon the VSC's device address as will be discussed in more detail hereinbelow. The time guards are set to prevent excessive cycling of the central systems 20 and 31. The Override is toggled ON or OFF by placing S5 in "F", entering "1" on Display 13 via switches S1 and S2, and using S3 and S4 to toggle the display to show "ON" or "OFF" as desired.

12. Local Setback Control

When the Local Setback Control function is OFF: (1) the VSC's operating schedule program is disabled; (2) the VSC's morning warm-up time limit function is disabled; (3) the slave VSCs 40 and 48 can follow the setback and VAV cooling time periods of another device on the communication bus 39 and 47; and (4) the VSC's morning warm-up operation can be activated by another device on bus 39 and 47. When this function is ON, the VSC 40 or 48 follows the operating schedules programs and the Morning Warm-up Time limit stored in its memory. (The latter can also be initiated earlier via another device). This function is controlled by placing S5 in position "F" and entering "2" on Display 13 via S1 and S2. S3 and S4 are used to toggle "ON" or "OFF" on Display 13.

13. Setback Programming Lock

When the Setback Programming Lock is ON: (1) the VSC's program mode is disabled; and (2) the operating schedule program time periods can be set via communication on bus 39 and 47. When this function is OFF, the time periods for the operating schedule program can be set either locally at the VSC 40 or 48 or through communication. This function is toggled ON or OFF in "F3".

14. Temperature Trend Staging

As will be explained in more detail below, Temperature Trend Staging is used to prevent unnecessary use of second stage heating or cooling if the temperature trend in the zones calling for heating or cooling meets certain requirements. In function "F4" Temperature Trend Staging is toggled ON or OFF.

15. Warm-Up Damper Override

During the Morning Warm-up Time Period, when the central system heating mode is selected, the VSC prepositions the dampers 25 and 27 of each slave thermostat 24 and 26 and fan-box monitor 28 in its system to its maximum air flow position when the Warm-up Mode Damper Override is ON. If this function is OFF, the various slave thermostats 24 and 26 and fan-box monitor 28 will modulate their associated damper 25, 27, 29 based on zone and system demand. This function is toggled ON or OFF in function "F5".

16. Supplemental Heat Fan Relay

The Supplemental Heat Fan Relay function energizes the central system fan any time a slave thermostat 24 or 26 associated with the VSC energizes a supplemental heat relay when it is ON. When OFF, this function will not energize the central system fan. This function is toggled ON or OFF in function "F6".

17. Supplemental Heat Callers

The VSC 11 allows slave thermostats 24 and 26 associated with its system to be considered as "Zone Heating Callers" when their zone supplemental heat source is energized. When this function in ON, slave thermostats 24 and 26 coordinate operation of supplemental and central heat sources to maintain zone comfort and eliminate over-conditioning caused by unnecessary operation of supplemental heat. When this function is OFF, zone slave thermostats 24 and 26 are not considered zone callers by energizing supplemental heat and thus do not directly control central system heat. In this configuration, zone supplemental heat can be used for total zone load leaving the central system 20 free to satisfy cooling demands at other zones in the system. This function is toggled ON or OFF in function "F7".

18. Local Outside Air Temperature Sensor

If outside air temperature sensor 23 is used in the system, data received from this sensor can be utilized directly and broadcast to other devices via bus 30 when this function is ON. When this function is OFF, a given VSC is programmed to receive outside air temperature from another device via bus 30 or bus 37 (FIG. 3). In "F8" this option is toggled ON or OFF.

19. Local Humidity Sensor

In "F9", the option to employ a local humidity sensor may be toggled ON or OFF. If the sensor is used it is wired to a relay pack 19 or 32.

20. Celsius Temperature Display

Temperature readings on Display 13 can be either in Celsius (ON) or Fahrenheit (OFF) as toggled in function "F10".

21. 2400 Band Rate

Data communication on buses 30, 37, 39, 45, and 47 can be either at 2400 Band (ON) or at 4800 (OFF) as selected in function "F11".

AUXILIARY FUNCTIONS

22. Communication Check

With S5 in position "C", a communication check procedure can be accomplished by depressing either S3 or S4 to toggle the function ON.

MODES OF OPERATION

System Operating Program

A user will program a VSC 11 for the scheduling of operating mode time periods in conjunction with real time clock 14. Slave VSCs 40 and 48 will be programmed for their respective operating modes with real time data received from master VSC 36 or a similar device. The operating mode time periods are (1) VAV Cooling; (2) Setback; and (3) Morning Warm-up either through (A) local control via the programmed schedule in a given VSC 11, 40, 48 or (B) remote control wherein a given VSC 40 or 48 follows the schedule of another device such as master VSC 36. During local control, the operating schedule programs can be locked to prevent authorized or mistaken changes.

The central system 20 or 31 is interfaced to a VSC 11 or master VSC 36 via a relay pack 19 or 32 which coordinates (1) two stages of cooling; (2) two stages of heating; (3) a fan; and (4) a heating lock out relay. The functions are enabled or disabled via switches S7, S8 and S9. Fan switch S7 has two positions: ON and AUTO. In ON the VSC 11 energizes the fan relay continuously when any slave thermostat 24 or 26 associated with its system is in (1) its comfort mode or (2) its Setback Override, which is considered the comfort mode. If all slave thermostats 24 and 26 associated with the VSC's system are in their setback mode, the VSC 11 energizes the fan relay only during a heating or cooling operation of VAV central system 20 or 31. When S7 is set to AUTO, the VSC 11 energizes the fan relay continuously during the VAV Cooling Period but in Setback or Morning Warm-up the VSC 11 will energize the fan relay only during a central system heating or cooling mode. Switch S8 has two settings: OFF, where the VSC 11 cannot select the heat mode; and AUTO, where the VSC 11 can select heat mode. Switch S9 also has two settings: OFF, where the VSC 11 cannot select the cool mode; and AUTO, where the VSC 11 can select the cool mode.

A slave thermostat 24 or 26 is considered a "Zone Caller" for heating or cooling whenever the zone demand for heating or cooling is 1.5° F. or greater. Zones associated with a fan-box monitor such as 28 are considered "System Callers" for heating or cooling whenever the monitor 28 has selected the given mode. Once a central system mode has been selected in accordance with the system mode demand number as programmed, a "reference zone" is periodically selected by a VSC 11. The reference zone is the zone which has the greatest demand of all callers, zone or system, for the selected mode. The VSC 11 can reselect a reference zone each time it scans the system for data. A heating or cooling mode continues until the reference zone has a demand of less than 0.5° F.

Daily Time Periods

The programming of the Daily Time Periods for operation of the VAV central system 20 or 31 utilizes PROGRAM switch S6, which is located beneath removable housing cover 12A. Depressing S6 activates the Program Mode. For purposes of programming, S1 is the ADVANCE TIME switch; S2, COPY; S3 is ON/OFF; and S4 is DAY SELECT.

Press the DAY SELECT switch until the proper number for a given day (Monday is "1", Sunday is "7") is displayed in the lower right-hand portion of Display 13. If the ON/OFF switch is now depressed, the starting time for the "Comfort Mode" will be displayed in the upper left-hand portion of Display 13 along with an "AM" or "PM" annunciator and an "ON" annunciator. If the ON/OFF switch is depressed again, the starting time for "Setback Mode" will be displayed with an "AM" or "PM" annunciator along with an "OFF" annunciator which signifies that the comfort mode will be "OFF" and setback will be "ON". The existing program can be erased by simultaneously pressing either ADVANCE TIME and COPY or ON/OFF and DAY SELECT.

To program, press the ON/OFF switch to display "ON" and press the ADVANCE TIME switch to display the time for the beginning of the comfort mode which is also the beginning of the cooling mode for a VAV central system. Depress ON/OFF to display "OFF". Now the ADVANCE TIME switch can be depressed to set the beginning of the setback mode. To copy a program from the previous day to the selected day simply depress the COPY switch. The user may exit the Program Mode by either depressing S6 or by not adjusting the Program Mode for 30 seconds.

Setback Time Guard

The cooling mode for VAV central system 20 or 31 is delayed after the beginning of the comfort/cooling mode time period for a time period that is calculated by multiplying the device address by 2.6 seconds. This feature allows the system to be brought into operation in a smooth, staged fashion.

Heating/Cooling Time Guard

The VSCs 11, 40, 48 have a time limit which prevents an individual central system heating or cooling mode from being immediately selected (1) after a particular mode has been completed; (2) after a particular VSC receives power to operate; and (3) after VSC reset, a procedure followed if a VSC determines through self-monitoring that faults exist in system communications, data storage, etc. via diagnostic checks. The time delay is calculated to be: 2.6 seconds times the device address plus minutes.

Temperature Trend Staging

The Temperature Trend establishes a pattern for the reference zone temperature conditions based on zone demand: (1) if the Temperature Trend is negative the zone temperature conditions are improving; (2) if the Temperature Trend is zero, the zone temperature conditions are not improving; and (3) if the Temperature Trend is positive, the zone temperature conditions are becoming worse.

The VSC 11, 40, or 48 begins to calculate the Temperature Trend for its system when the reference zone demand reaches 2.0° F. or greater. The calculation procedure is as follows: (1) the initial value of the Temperature Trend (TT) is set to zero; (2) approximately every 10 seconds the VSC 11, 40, 48 performs a temperature trend calculation to determine a new value TT (new)=TT (old) +current demand (CDmd)−previous demand (PDmd)]. In one special case where TT (new) is negative and CDmd-PDmd is positive, the negative TT (new) is replaced with the positive value obtained as CDmd-PDmd. For example, if the original demand was 3° F. and decline to 2.5° F., an increase to 2.7° F. would incorrectly indicate that zone temperature conditions had improved because the original 3.0° F. demand signal reading was set to zero.

If Temperature Trend Staging was originally set to ON, a VSC 11 will energize the 2nd stage of heating or cooling if TT (new) is continuously positive or zero for 6 minutes. The master VSC 36 controls the VAV central system 31 according to whether its Temperature Trend Staging is ON or OFF.

SYSTEM TYPE

VSC

When a VSC 11 (FIG. 2) is programmed to function as a single VSC, the VSC 11 initiates communication with its associated slave thermostats 24 and 26 and fan-box monitors 28 to distribute system information or instructions and collect zone information. The VSC will then select the appropriate heating or cooling mode of the central unit 20 via the relay pack 19 in accordance with the programming of the VSC 11.

SLAVE VSC

A VSC can be set to function as a slave VSC 40 and 48. The slave VSC 40 and 48 will initiate communication with their respective slave thermostats 41 and 49 and fan-box monitors 43 and 51 to distribute system information or instructions and collect zone information. The slave VSC 40 and 48 will communicate with master VSC 36 to provide the zone and system information it has collected for overall system operation.

MASTER VSC

When a VSC is set to be a master VSC 36 it will initiate communication with its associated slave VSCs 40 and 48 to distribute system information or instructions and collect zone and system information which has been collected by slave VSCs 40 and 48. The master VSC 36 operates VAV central system 31 via relay pack 32 in accord with the programming of the system.

To summarize the operation of the system, a central VAV systems unit 20 is controlled via VSC 11 in its "single VSC" operating type with a morning warm-up cycle prior to the initiation of a VAV cooling time period that is set to match normal business hours. In setback, supplemental heat that is associated with one or more of the slave thermostats 24 and 26 and the use of heat via fan-powered mixing box 29 and any associated slave thermostats associated therewith allows for the heating of building perimeter areas if outside temperature is below a given setpoint. The central system 20 can also be used in the Morning Warm-up Mode.

During the cooling time period (the Comfort Mode) a cooling mode is selected by VSC 11 depending upon the number of zone callers and system callers demanding a given mode Temperature Trend Staging may also be employed if desired.

In Setback, heat is provided as needed utilizing the setback heat sources that have been chosen. Supplemental heat callers may be used to determine if the system mode should be heating if this function has been programmed.

Slave VSCs 40 and 48 and master VSC 36 operate to coordinate the functions of their associated systems as programmed depending upon the utilization of Local Setback Control and Setback Programming Lock (steps 11 and 12).

The air temperature at a given VSC 11, 36, 40 and 48 can be measured locally or via a remote sensor. This data is read from Display 13 via the extra temp switch S4. An additional function that is provided is the high limit time guard. This function presents an individual heating relay from being reenergized for a set period of time after a high temperature setpoint limit is exceeded. The time limit is set at 2.6 seconds ×the device address+5 minutes. Finally, in the actual system configuration, only one real time clock 14 will be used for time data to avoid conflicting data on the particular communications buses 30, 37, 45, 39 and 47 that are used. The time-of-day can be read out on the Display 13 of the other VSCs, by simultaneously depressing S1 and S2 or S3 and S4. If installed, data from a humidity sensor will also be displayed automatically following the time-of-day by keeping the switches depressed.

Diagnostics

In addition to providing the usual annunciators for "heat", "cool" and "fan" on Display 13 to indicate operation of system components, Display 13 also provides visual indication of certain diagnostic problems, called errors. Non-transparent errors indicate invalid data (storage failure, SF) or component failures or temperature sensors out of range (hardware failure, HF). In addition a transparent error, supply air temperature out of range, may exist. This error is not displayed and is cleared via the communication bus connected to the given VSC and need not be discussed further in this application.

The object code for the programs used in the VAV system coordinator (VSC) 11 is attached as Appendix A.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

```
3000:  75 84 B7 15 D5 24 F7 04   09 D5 AF 23 F7 62 B8 75   u....$.. ...#.b.u
3010:  F0 17 C6 26 B9 F7 81 37   72 26 19 81 A9 18 F0 03   ...&...7 r&.....
3020:  A0 F6 26 10 29 A1 B8 77   10 F0 53 0F D3 0E 96 31   ..&.)..w ..S....1
3030:  30 D3 0E 12 39 77 03 B9   B3 94 F0 FC C6 95 53 F0   0...9w.. ......S.
3040:  96 95 B8 39 F0 53 7F 03   ED E6 95 94 F6 04 4B 74   ...9.S.. ......Kt
3050:  00 04 95 B9 04 14 B1 FE   53 78 D3 18 B9 00 96 62   ........ Sx.....b
3060:  B9 40 B8 3A F0 53 BF 49   A0 43 80 04 92 74 5E 04   .@.:.S.I .C...t^.
3070:  95 B8 7C 10 F0 53 3F 96   86 B9 3C F1 53 30 C6 86   ..|..S?. ..<.S0..
3080:  E7 E7 B9 2D D1 A1 F0 96   95 B9 0A 14 B1 04 95 34   ...-.... .......4
3090:  00 FE B8 F9 90 16 9A E5   04 4B C7 07 53 07 E7 03   ........ .K..S...
30A0:  09 A8 F0 53 EF A0 B8 73   27 20 12 AE FF 93 FF E4   ...S...s '......
30B0:  C4 18 F0 C6 B6 10 E9 B1   83 4F 53 6D 8F 71 57 91   ........ .OSm.qW.
30C0:  B8 36 F0 53 0A 97 67 67   13 01 52 FC AA 23 B0 D4   .6.S..gg ..R..#..
30D0:  F8 C6 C0 F0 53 05 B8 36   BB 0A 96 E4 F0 5B C6 F8   ....S..6 .....[..
30E0:  77 77 04 EE F0 5B 72 F8   E7 E7 72 EE 23 02 5B 20   ww...[r. ..r.#.[
30F0:  53 F5 40 A0 23 01 B4 F9   74 F7 04 C0 23 00 04 EE   S.@.#... t...#...
3100:  B8 F6 76 27 B5 FD F7 B9   4D E6 1E FE B9 49 B2 1E   ..v'.... M....I..
3110:  53 18 D3 18 B9 4F C6 1E   B9 4B 72 1E B9 47 F1 C8   S....O.. .Kr..G..
3120:  90 18 19 F1 F7 77 90 80   F2 94 A5 FD F2 39 43 80   .....w.. .....9C.
3130:  AD 8A 10 B9 26 23 08 24   68 B8 37 FE 82 54 37 72   ....&#.$ h.7..T7r
3140:  5F 92 4E B9 28 9A EF FD   53 7F AD 27 24 68 B9 20   _.N.(... S..'$h.
3150:  23 38 24 68 B9 22 F0 53   02 C6 61 23 10 24 68 B9   #8$h.".S ..a#.$h.
3160:  24 F0 53 04 C6 45 23 18   2E 53 07 4E AE BB 03 27   $.S..E#. .S.N..'
3170:  AA 97 F7 2A F7 2A 61 19   2A 71 2A C9 EB 71 A1 B8   ...*.*a. *q*..q..
3180:  F5 80 61 A1 18 80 53 07   7A BB 03 97 67 21 67 21   ..a...S. z...g!g!
3190:  EB 8B 19 A1 83 B8 39 A0   C6 D4 03 ED F6 AC F0 07   ......9. ........
31A0:  F5 F4 00 E5 AD FD A3 A0   18 1D EE A5 E5 B8 39 F0   ........ ......9.
31B0:  C6 D4 F2 D4 03 E8 F6 B6   F0 D4 79 AB 03 E7 BA EC   ........ ..y.....
31C0:  F6 C4 BA 5C 27 54 EE F0   03 EA E6 D5 D4 D8 F5 54   ...\'T.. .......T
31D0:  00 E5 24 AC 27 83 3F 81   08 00 00 00 00 00 00 00   ..$.'.?. ........
31E0:  80 00 00 04 00 04 00 04   00 04 00 04 00 00 00 00   ........ ........
31F0:  66 66 66 66 66 66 66 B8   3B 20 43 80 20 93 00 00   ffffff. ; C. ...
3200:  34 AC C6 05 83 B8 34 F0   32 23 B9 7B F1 96 1A B8   4.....4. 2#.{....
3210:  6D F0 C6 30 07 A0 B9 7B   B1 01 F1 53 E0 96 23 23   m..0...{ ...S..##
3220:  F0 44 EE B8 6D F0 C6 30   03 F0 F6 30 F0 03 76 B3   .D..m..0 ...0..v.
3230:  B8 6E F0 12 61 32 67 52   6B 72 6F 44 6B B8 3E F0   .n..a2gR kroDk.>.
3240:  D4 79 AB C8 F0 5F C6 0F   D4 79 AA 03 F0 A7 F0 B9   .y..._.. .y......
3250:  08 F2 55 B9 10 F9 67 44   EE B9 28 D4 64 B4 98 44   ..U...gD ..(.d..D
3260:  73 B8 24 B4 5A 44 73 B8   26 44 71 B8 20 44 71 B8   s.$.ZDs. &Dq. Dq.
3270:  22 B4 56 23 20 44 EE 59   3D B8 7A B0 46 B8 41 F0   ".V# D.Y =.z.F.A.
3280:  54 DC AE F0 47 54 DC AB   FE AA 27 D4 F8 F4 7F C6   T...GT.. ..'.....
3290:  7D B8 41 FA 72 BC 52 B3   12 A1 F0 03 F0 E6 CF 44   }.A.r.R. .......D
32A0:  A6 F0 03 10 F6 CF A0 5F   C6 CF 54 E8 E6 CF F0 47   ......._ ..T....G
32B0:  30 44 CF F0 5F DF C6 CF   F0 17 44 C2 F0 5F C6 CF   0D.._... ..D.._..
32C0:  F0 07 A0 53 F0 C6 CF 54   E8 E6 CF F0 47 30 A0 FA   ...S...T ....G0..
32D0:  53 60 C6 7D 23 06 B4 F9   74 F7 44 79 5F C6 E6 AA   S`.}#... t.Dy_...
32E0:  23 00 03 05 EA E2 C4 79   F0 37 5F 47 60 83 B9 2D   #......y .7_G`..-
32F0:  31 53 F0 2A 19 A1 19 FB   A1 B9 33 F1 5F 4A A1 83   1S.*.... ..3._J..
3300:  B8 33 F0 53 F8 AB B8 2D   F0 AA 18 B9 F0 FB 72 4D   .3.S...- ......rM
3310:  37 32 33 C8 F0 E7 47 53   40 2A F7 2A F7 77 A9 F0   723...GS @*.*.w..
```

```
3320: 53 0D 49 A9 B8 32 F0 77   77 53 02 49 B9 F2 91 19   S.I..2.w wS.I....
3330: B8 2F CB F0 47 A0 53 0F   03 4E A3 2A F7 2A F7 77   ./..G.S. .N.*.*.w
3340: 2B 97 A7 F7 2B E6 49 53   80 91 19 64 0D 83 3F 06   +...+.IS ...d..?.
3350: 5B 4F 66 6D 7D 07 7F 6F   39 79 71 7C 76 50 89 17   [Ofm}..o 9yq|vP..
3360: BA 17 FD 53 E8 A9 09 37   5A 49 2D DD 5A 96 BA B8   ...S...7 ZI-.Z...
3370: FC 80 37 47 2C DC 96 BA   FD 53 0F A9 FC 53 F0 49   ..7G,... .S...S.I
3380: B8 30 A0 FC 53 0F A9 FD   53 10 49 A9 18 F0 53 1F   .0..S... S.I...S.
3390: A0 BA 30 BB 80 F9 5A 96   A7 F0 5A C6 A7 FA 37 53   ..0...Z. ..Z...7S
33A0: 0F 59 96 A7 F0 4B A0 FB   77 AB FA 77 77 AA 37 F2   .Y...K.. w..ww.7.
33B0: 95 F9 40 A0 03 A0 27 67   40 A0 83 B8 7A B0 46 B8   ..@...'g @...z.F.
33C0: 42 F0 03 EC 23 13 F6 E9   F0 17 D4 79 AA 23 30 D4   B...#... ...y.#0.
33D0: F8 F4 7F C6 BF FA 53 05   B8 42 96 E2 F0 C6 EA 07   ......S. .B......
33E0: 64 E9 F0 03 ED F6 EA F0   17 A0 FA 53 60 C6 BF 23   d....... ...S`..#
33F0: 07 B4 F9 74 F7 64 BB B8   31 27 A0 83 00 00 00 00   ...t.d.. 1'......
3400: B8 7A B0 46 94 50 F1 03   E7 23 18 F6 3C F1 C6 17   .z.F.P.. .#..<...
3410: A8 23 00 03 05 E8 13 D4   79 AB 23 80 2A 96 21 BA   .#...... y.#.*.!.
3420: C0 2A D4 F8 F4 7F C6 04   94 50 FA 53 05 96 35 F1   .*...... .P.S..5.
3430: C6 3D 07 84 3C F1 03 E8   F6 3D F1 17 A1 FA 53 60   .=..<... .=....S`
3440: C6 04 FC B8 04 C6 49 B8   05 F8 B4 F9 74 F7 84 00   ......I. ....t...
3450: B9 6D F1 D3 05 AC B9 3F   C6 5C B9 40 83 B8 7A B0   .m.....? .\.@..z.
3460: 46 D4 EE B8 6D 96 7A F0   B9 47 D3 07 C6 70 B9 49   F...m.z. .G...p.I
3470: D4 64 AB 27 D4 F8 C6 61   84 B3 F0 D3 07 C6 83 54   .d.'...a .......T
3480: 6F 84 85 54 6B D4 FA F4   7F C6 61 B8 6D F0 D3 07   o..Tk... ..a.m...
3490: AC B9 47 C6 97 B9 49 F4   18 C6 B3 FC B9 20 C6 A2   ..G...I. ........
34A0: B9 22 F4 18 F0 53 60 C6   61 FC B9 0C C6 B0 B9 0D   ."...S`. a.......
34B0: F9 B4 F9 74 F7 84 61 94   F6 89 40 B8 FF B0 00 E8   ...t..a. ..@.....
34C0: BD 99 BF BF 0F 23 F7 62   55 25 9A 1F F4 3D F5 94   .....#.b U%...=..
34D0: 7B E5 B8 6A F0 37 03 8C   B8 7D A0 18 A0 B8 36 F0   {..j.7.. .}....6.
34E0: B8 E8 72 E6 B8 FC F8 B8   83 A0 B8 85 B0 FC C4 32   ..r..... .......2
34F0: B8 7C F0 DD 82 FE B8 FA   23 0F 90 18 27 90 83 00   .|...... #...'...
3500: B8 38 F0 12 0C B8 30 F0   47 5F 96 0E C4 46 B8 83   .8....0. G_...F..
3510: B0 8C B8 70 B0 5A B8 6D   A0 03 27 B3 27 B8 31 A0   ...p.Z.m ..'.'.1.
3520: B8 6D A0 B8 83 A0 A4 00   37 39 3B 3D 3F 3F 41 41   .m...... 79;=??AA
3530: 43 45 47 49 4B 4B 53 A4   FE A4 A9 E4 5F C4 96 84   CEGIKKS. ...._...
3540: 00 84 5D 64 BB 44 79 04   C0 E4 A4 23 F0 D4 F8 74   ..]d.Dy. ...#...t
3550: F7 A4 4B F5 84 8D BB A1   A4 5C BB A5 B9 36 F1 47   ..K..... .\...6.G
3560: 53 02 AA 6B AB A3 60 2B   17 18 A3 70 2A 96 72 FB   S..k..`+ ...p*.r.
3570: A4 96 27 A8 B9 8E BC 09   97 28 67 28 67 29 97 67   ..'..... .(g(g).g
3580: 29 E6 87 6B 28 7A 28 EC   79 03 01 AA F8 13 00 F2   )..k(z(. y.......
3590: 94 2A A4 96 27 AA D4 7B   AB 47 5F 2A 5F 47 4A AA   .*..'..{ .G_*_GJ.
35A0: 83 2C 01 EC FF 00 00 C0   FE B8 7A B0 46 B8 43 F0   .,...... ..z.F.C.
35B0: 03 88 23 77 F6 EB F0 BB   00 C6 CD 03 F4 1B C6 CD   ..#w.... ........
35C0: F6 BB CB 03 0C AA 27 03   05 EA C7 D4 79 2B AA 23   ......'. ....y+.#
35D0: 80 D4 F8 F4 7F C6 AD FA   53 05 B8 43 96 E4 F0 C6   ........ S..C...
35E0: EC 07 A4 EB F0 03 89 F6   EC F0 17 A0 FA 53 60 C6   ........ .....S`.
35F0: AD 23 08 B4 F9 74 F7 A4   AD F5 54 C1 E5 83 B8 7A   .#...t.. ..T....z
3600: B0 46 B8 6A F0 17 D4 79   AA 23 30 D4 F8 F4 7F C6   .F.j...y .#0.....
3610: 02 FA B8 6A 53 05 96 1E   F0 C6 22 07 C4 22 F0 17   ...jS... .."..".. 
3620: D2 1B 53 3F A0 FA 53 60   C6 02 23 00 B4 F9 74 F7   ..S?..S` ..#...t.
3630: A4 FE F5 B8 70 B0 00 F4   A5 23 00 D4 DB 9A 1F 74   ....p... .#.....t
3640: B3 54 00 E5 A4 00 54 00   B8 39 F0 B8 6F F2 54 C6   .T....T. .9..o.T.
3650: 54 A0 C4 5A 27 20 C6 5A   F4 3D F5 74 00 54 00 E5   T..Z' .Z .=.t.T..
3660: F4 B5 E4 9C F1 03 F0 19   F1 13 D8 E6 73 23 0F BA   ........ ....s#..
3670: 27 C4 7B F1 AA C9 F1 C4   7B BA 00 AF 27 AC AD B9   '.{..... {...'...
3680: 10 FF F7 AF FA F7 AA FC   7C 57 AC FD 7D 57 AD E9   ........ |W..}W..
3690: 81 AA FC BF 0F 83 B8 36   F0 53 C0 C6 B9 D3 C0 B8   .......6 .S......
36A0: 30 BA A5 C6 AD B8 70 BA   A0 D2 AD BA 50 F8 D4 F8   0.....p. ....P...
36B0: C6 96 B8 36 F0 03 40 E6   BB 43 40 A0 23 01 B4 F9   ...6..@. .C@.#...
36C0: 74 F7 C4 96 B9 83 F1 96   ED B9 80 F1 96 DD B9 55   t....... .......U
36D0: A1 19 A1 B9 5B A1 19 A1   B9 2D F1 5F A1 B9 3A F1   ....[... .-._..:.
36E0: 53 C0 21 5F C6 ED B9 7D   B1 8C 19 B1 8C 83 B8 31   S.!_...} .......1
36F0: F0 77 77 D0 37 53 03 83   54 EE F5 54 00 E5 D4 C4   .ww.7S.. T..T....
3700: B8 30 F0 47 5F C6 16 B9   6D D1 5F 96 16 18 F0 F2   .0.G_... m._.....
3710: 14 53 60 83 64 F7 A4 1C   B8 77 F0 5F D3 05 C6 18   .S`.d... .w._....
3720: B8 31 F0 53 05 BA 01 BB   00 96 34 BA FF CB F1 19   .1.S.... ..4.....
3730: 41 C9 C6 3C F1 6A A1 19   F1 7B A1 FF 83 B8 8A B0   A..<.j.. .{......
```

```
3740: 00 18 B0 EE F5 54 00 E5   B8 8B F0 C8 60 E6 50 83    .....T.. ....`.P.
3750: F0 10 F5 D4 00 E5 C6 44   B8 8A F0 34 95 E4 44 B8    .......D ...4..D.
3760: 36 F0 B8 30 BA A5 92 6C   B8 70 BA A0 F8 D4 F8 C6    6..0...l .p......
3770: 5F B8 36 F0 D3 10 A0 23   01 B4 F9 74 F7 E4 5F B8    _.6....# ...t.._.
3780: 31 F0 AA 53 60 B8 7A BB   46 96 98 FA 5F 96 93 F4    1..S`.z. F..._...
3790: 98 27 83 BB F1 F0 96 91   FB A0 83 00 99 7F 00 00    .'...... ........
37A0: 00 00 C4 32 99 7F 00 00   00 00 00 A4 1C 99 7F 00    ...2.... ........
37B0: 00 00 00 00 83 99 7F 00   00 00 00 00 00 00 00 00    ........ ........
37C0: 00 00 04 09 99 7F 00 00   00 D4 79 99 7F 00 00 00    ........ ...y....
37D0: 54 EE E4 CB D4 C4 E4 CB   54 00 E4 CB F5 54 C1 E5    T....... T....T..
37E0: E4 CB F5 54 00 E5 E4 CB   F5 94 00 E5 E4 CB F5 F4    ...T.... ........
37F0: D3 E5 E4 CB F5 F4 5A E5   E4 CB F5 54 05 E5 E4 CB    ......Z. ...T....
3800: B0 87 18 B0 08 18 B9 36   F1 A0 18 B9 39 F1 A0 23    .......6 ....9..#
3810: 04 44 4D F0 F2 1F B9 6A   BB 00 F0 53 3F 04 F4 42    .DM....j ...S?..B
3820: 53 03 C6 16 44 1C B9 34   F1 43 40 A1 B9 3D 23 02    S...D..4 .C@..=#.
3830: F4 D3 44 4C F4 C1 67 B9   32 F1 67 E7 04 E8 B9 35    ..DL..g. 2.g....5
3840: F1 43 20 A1 B9 24 04 2E   B9 28 04 2E 24 C0 B9 A1    .C ..$.. .(..$...
3850: F1 37 17 B9 74 61 AA AB   F0 03 1F A9 F1 A0 18 EA    .7..ta.. ........
3860: 58 FB 44 4D F0 C6 69 23   01 B8 34 20 53 FE 40 A0    X.DM..i# ..4 S.@.
3870: 04 E9 B9 45 BB 0A 04 F3   B9 20 23 10 F4 D0 44 4D    ...E.... . #...DM
3880: B9 30 23 0F 04 7C B9 3F   23 12 04 7C B9 51 23 0E    .0#..|.? #..|.Q#.
3890: 04 7C B9 5F 23 04 F4 D0   BA 07 F0 A1 19 B1 00 18    .|._#... ........
38A0: 19 EA 9A 23 12 44 4D B9   36 F1 AA F4 C1 53 9F 20    ...#.DM. 6....S. 
38B0: 53 60 AB FA 37 32 BE B9   3B F1 53 9F 4B A1 B9 32    S`..72.. ;.S.K..2
38C0: FA 12 C9 F0 53 FD A0 04   D1 F1 53 98 20 53 67 40    ....S... ..S. Sg@
38D0: A0 F1 53 44 40 A1 FA 37   32 E9 18 F0 53 20 41 A1    ..SD@..7 2...S A.
38E0: 19 F1 53 F9 20 53 06 40   A1 B8 80 B0 8C 44 4C B9    ..S. S.@ .....DL.
38F0: 3F BB 04 F0 A1 54 4C FB   44 C1 E5 34 95 F5 83 00    ?....TL. D..4....
3900: B9 40 BB 05 04 F3 B9 41   BB 06 04 F3 B9 36 23 03    .@.....A .....6#.
3910: F4 D3 54 4C 23 01 54 C1   23 02 54 C1 23 03 44 C1    ..TL#.T. #.T.#.D.
3920: B9 42 BB 07 04 F3 B9 5F   23 04 F4 D3 BA 07 F0 A1    .B....._ #.......
3930: 18 18 19 EA 2E BB 11 04   F5 B9 43 BB 08 04 F3 B9    ........ ..C.....
3940: 44 BB 09 04 F3 B9 46 BB   0B 04 F3 B9 3A BA 3F 34    D.....F. ....:.?4
3950: F6 04 E9 B9 2D F0 31 04   E8 B9 33 BA 08 34 F6 72    ....-.1. ..3..4.r
3960: 6A 19 BA 02 34 F6 32 76   44 4C B9 F0 BA 05 18 F0    j...4.2v DL......
3970: 91 19 EA 6E 04 E9 B9 6D   18 F0 BA 02 D3 03 C6 95    ...n...m ........
3980: CA D3 06 C6 95 B9 34 F1   53 FD A1 B9 6E F0 AA 03    ......4. S...n...
3990: FA E6 95 BA 08 FA A1 04   E9 B9 47 BB 0C 23 02 F4    ........ ..G..#..
39A0: D3 04 F5 B9 49 BB 0D 24   9D B9 4B BB 0E 24 9D B9    ....I..$ ..K..$..
39B0: 4D BB 0F 24 9D B9 4F BB   10 24 9D B9 39 F1 F2 C3    M..$..O. .$..9...
39C0: C8 44 4A B1 00 44 4C 43   4F 50 59 52 49 47 48 54    .DJ..DLC OPYRIGHT
39D0: 20 28 43 29 20 31 39 38   37 2C 38 38 20 42 59 20     (C) 198 7,88 BY 
39E0: 50 41 52 4B 45 52 20 45   4C 45 43 54 52 4F 4E 49    PARKER E LECTRONI
39F0: 43 53 20 49 4E 43 2E 5A   2A 37 51 4A A1 83 00 00    CS INC.Z *7QJ....
3A00: 94 00 E6 05 83 D3 09 96   25 18 F0 37 96 1C F8 A9    ........ %..7....
3A10: 18 BA 04 F0 A1 18 19 37   C6 1E EA 13 84 7D FA 03    .......7 .....}..
3A20: F8 37 B9 A1 A1 D4 6F C6   1C F0 53 C0 C6 1C F0 D2    .7....o. ..S.....
3A30: 35 03 0A 44 3A 03 B6 F6   4A F0 03 5E F6 4A B9 70    5..D:... J..^.J.p
3A40: B1 5A B0 06 18 43 C0 03   7D B3 B0 15 27 17 B8 A1    .Z...C.. }...'...
3A50: 60 A0 B8 87 F0 D3 F1 C6   1C E4 5A 7D 7F 81 83 85    `....... ..Z}....
3A60: 87 89 8B 8D 8F 91 93 95   97 99 9B 9D 9F A1 A3 A5    ........ ........
3A70: A7 A9 AB AD AF B1 B3 B5   B7 B9 BB BD BF 04 00 04    ........ ........
3A80: 13 04 26 04 34 04 3E 04   48 04 4C 04 4E 04 72 04    ..&.4.>. H.L.N.r.
3A90: 64 04 78 04 80 04 86 04   8C 04 92 04 A7 04 EF 24    d.x..... ......$
3AA0: 00 24 06 24 0C 24 20 24   26 24 39 24 3F 24 45 24    .$.$.$ $ &$9$?$E$
3AB0: 4B 24 53 24 59 24 99 24   A3 24 A9 24 AF 24 B5 24    K$S$Y$.$ .$.$.$.$
3AC0: BB A8 B9 70 F1 D3 5A 96   C7 F4 A5 23 30 D4 DB F8    ...p..Z. ...#0...
3AD0: 17 B9 39 D1 96 D7 A1 F8   F4 00 F5 F4 A5 FD 43 C0    ..9..... ......C.
3AE0: D4 DB F4 A5 FD 1D 43 40   D4 DB F0 18 D4 49 D4 E4    ......C@ .....I..
3AF0: FA D4 E4 9A 1F EE DA B8   6F B0 FF 83 00 00 00 00    ........ o.......
3B00: B8 6A F0 53 C0 C6 0B 23   01 14 FA B8 45 F0 53 5F    .j.S...# ....E.S_
3B10: C6 16 23 0B 14 FA B8 F7   B9 45 80 D1 53 A0 C6 22    ..#..... .E..S.."
3B20: F1 90 B8 44 F0 03 A3 C7   53 C0 C6 30 23 0A 14 FA    ...D.... S..0#...
3B30: B8 48 B9 0D F4 DD B8 4A   B9 0E F4 DD B8 4C B9 0F    .H.....J .....L..
3B40: F4 DD B8 4E B9 10 F4 DD   B8 50 B9 11 F4 DD B8 36    ...N.... .P.....6
3B50: F0 53 C0 C6 5C F0 53 0A   D3 0A 96 60 23 02 14 FA    .S..\.S. ...`#...
```

```
3B60: B8 3F B9 05 23 E7 B4 F9   B8 40 B9 06 23 E7 B4 F9   .?..#... .@..#...
3B70: B8 42 B9 08 23 EC B4 F9   B9 43 B9 09 03 88 B4 F9   .B..#... .C......
3B80: B8 41 F0 37 5F 47 60 E6   8D 23 07 14 FA B8 37 F0   .A.7_G`. .#....7.
3B90: 53 E1 C6 98 23 03 14 FA   B8 38 F0 53 DC C6 A3 23   S...#... .8.S...#
3BA0: 04 14 FA B8 36 F0 37 32   B1 B9 39 F0 37 F2 B1 B0   ....6.72 ..9.7...
3BB0: 00 A4 8A B8 31 F0 F2 E8   53 60 C6 E7 B9 03 B2 C2   ....1... S`......
3BC0: B9 0C F0 59 AA D9 B9 6D   96 D3 B1 03 B9 34 F1 53   ...Y...m .....4.S
3BD0: 02 64 DD F1 96 DB B9 6E   FA 64 E4 23 02 B9 7B B1   .d.....n .d.#..{.
3BE0: 00 B9 34 D1 A1 B0 00 83   E5 F4 AD F5 83 23 01 8A   ..4..... .....#..
3BF0: 40 97 F7 46 F6 17 9A BF   9A BF E6 EF 83 00 00 00   @..F.... ........
3C00: BC 00 27 B8 75 A0 AD AE   B4 0A F6 77 AB 1C B0 FF   ..'.u... ...w....
3C10: 18 F0 07 A0 AA C6 24 03   A0 F6 19 B9 A1 F1 C9 A1   ......$. ........
3C20: 19 19 EA 1D C8 10 B8 9F   FB D3 F1 C6 34 B9 6A F1   ........ ....4.j.
3C30: 17 DB 96 02 B9 78 B1 F8   B9 78 F1 C6 7B F5 B4 0A   .....x.. .x..{...
3C40: F6 38 18 A0 CA FA C6 63   D3 FC 96 34 F0 07 C8 40   .8.....c ...4...@
3C50: D3 04 96 02 C8 F0 B9 74   07 A1 03 03 AA 03 A4 E6   .......t ........
3C60: 34 84 02 FD 4E 96 7B B8   75 B0 FF 18 A0 B8 A1 A0   4...N.{. u.......
3C70: B9 87 FB A1 18 F0 83 FC   96 83 83 97 A7 B8 76 27   ........ ......v'
3C80: A0 C8 A0 B9 45 F1 53 A0   B9 F7 91 F9 83 B8 8A B0   ....E.S. ........
3C90: 01 B8 8A F0 E5 D4 79 F5   AA 94 CF 51 B8 31 C6 A1   ......y. ...Q.1..
3CA0: 18 F8 E5 D4 F8 F5 C6 91   F0 B8 8A D2 B8 94 CF D1   ........ ........
3CB0: A1 FB C6 C9 54 C1 84 C9   72 C4 F0 03 F5 E6 C1 B0   ....T... r.......
3CC0: 0A 10 84 C9 F0 07 C6 C9   A0 E5 74 F7 F5 84 91 F0   ........ ..t.....
3CD0: E7 60 03 DB AB A3 2B 17   A9 A3 29 17 A3 83 00 32   .`....+. ..)....2
3CE0: 04 01 36 01 03 38 02 02   37 08 03 38 20 01 36 04   ..6..8.. 7..8 .6.
3CF0: 02 37 10 02 37 02 02 37   04 01 36 20 0A 45 80 00   .7..7..7 ..6 .E..
3D00: B9 87 A1 B9 78 B1 F8 97   A4 0C 97 A7 0A B2 0C BF   ....x... ........
3D10: 0F B9 77 F1 5F D3 05 C6   28 B9 1D F1 53 DF A1 B9   ..w._... (...S...
3D20: 7C F1 53 20 B9 1D 41 A1   0A B2 83 05 F6 51 B9 78   |.S ..A. .....Q.x
3D30: F1 96 37 23 16 04 FA B9   F7 81 12 0F A9 E7 E7 49   ..7#.... ........I
3D40: 47 53 80 B9 3B 41 A1 F2   62 B9 87 F1 B9 F8 91 A4   GS..;A.. b.......
3D50: 62 B9 76 F1 C9 D1 96 59   83 F1 11 03 A0 A9 F1 B9   b.v....Y ........
3D60: 87 A1 B9 36 F1 47 F7 B9   7C F1 5F B9 0B E6 71 B9   ...6.G.. |._...q.
3D70: 33 69 37 B9 79 A1 B9 3B   F1 53 7F 21 F2 85 B9 87   3i7.y..; .S.!....
3D80: F1 E4 86 E4 B3 C7 07 D7   84 7B B8 36 F0 AA 32 9C   ........ .{.6..2.
3D90: B8 37 F0 37 32 9C B8 35   F0 53 DF A0 B8 80 F0 C6   .7.72..5 .S......
3DA0: A7 03 74 F6 D3 E4 CC B8   32 F0 53 DC A0 FA 12 B6   ..t..... 2.S.....
3DB0: F0 43 10 53 75 A0 18 F0   53 F7 A0 FA 37 32 CE F0   .C.Su... S...72..
3DC0: 53 F1 A0 B9 2D F1 5F A1   B9 3B F1 53 9F A1 18 F0   S...-._. .;.S....
3DD0: 53 FE A0 B8 77 F0 5F D3   05 C6 F8 B8 20 BA 13 BB   S...w._. .... ...
3DE0: 02 B9 39 F0 03 24 18 F0   13 FA E6 EF FA A1 83 FA   ..9..$.. ........
3DF0: D1 96 F4 A1 18 1A EB E1   83 60 F6 FD 83 F9 04 FA   ........ .`......
3E00: F4 00 F5 F4 A5 FD 43 80   D4 DB B9 78 B1 FA 46 15   ......C. ...x..F.
3E10: F1 96 0E E4 BB B1 00 74   ED AA 74 ED 9A 1F D4 4E   .......t ..t....N
3E20: 2A C6 41 A9 BB 08 FB 03   66 A3 AC D9 53 1F C6 33   *.A..... f...S..3
3E30: EB 26 83 FC 47 77 53 07   17 A9 23 80 E7 E9 3C DA   .&..GwS. ..#...<.
3E40: AA FA A0 18 1D EE 02 27   83 AA B9 00 C4 4F A9 FA   .......' .....O..
3E50: BB 08 12 56 C4 5C FB 03   66 A3 D9 A9 FA 77 AA EB   ...V.\.. f....w..
3E60: 52 AA F9 53 1F 2A 83 FC   CB BA 99 67 56 35 13 F0   R..S.*.. ...gV5..
3E70: D3 05 96 99 B9 87 B1 F1   A9 AA AB AC AD 18 F8 03   ........ ........
3E80: 00 27 F6 9A F0 17 96 9B   1D FD 12 7D 18 F9 C6 93   .'...... ...}....
3E90: FA C6 9A FB C6 99 FC C6   9A FF 83 FD 96 B4 19 18   ........ ........
3EA0: F0 C8 C6 AC F0 D3 87 96   7D 1A C4 7D 23 87 D4 D0   ........ }..}#...
3EB0: E6 A9 C4 7D F9 AE B9 6A   F1 17 2E A9 1B 18 F0 C8   ...}...j ........
3EC0: C6 C9 F0 DE 96 7D 1C C4   7D FE D4 D0 E6 C6 C4 7D   .....}.. }......}
3ED0: AE 37 60 18 18 F6 DA F0   37 6E 83 8A 40 9A BF B9   .7`..... 7n..@...
3EE0: 09 77 C4 EE B9 08 F2 EE   9A 7F 8A 40 C4 F4 8A 80   .w...... ...@....
3EF0: 8A 40 C4 F4 E7 8A 40 9A   BF E9 E6 83 00 00 00 00   .@....@. ........
3F00: E7 E7 03 12 AE A3 A8 1E   FE A3 AD 1E FE A3 2E 17   ........ ........
3F10: A3 83 6A 00 01 D6 36 01   01 D7 37 02 01 D8 38 03   ..j...6. ..7...8.
3F20: 01 D9 3F 04 01 DA 40 05   01 DB 41 06 01 DC 42 07   ..?...@. ..A...B.
3F30: 01 DD 43 08 01 DE 44 09   01 DF 45 0A 01 E0 46 0B   ..C...D. ..E...F.
3F40: 01 E1 47 0C 02 E2 49 0E   02 E4 4B 10 02 E6 4D 12   ..G...I. ..K...M.
3F50: 02 E8 4F 14 02 EA 5F 16   0B EC 27 AD AE B8 A0 F0   ..O..._. ..'.....
3F60: B4 00 B9 6A F1 17 B4 00   18 F0 AA B4 00 23 04 B4   ...j.... .....#..
3F70: 00 23 01 B4 00 18 F0 F5   B4 00 EA 75 FD A8 FE B4   .#...... ...u....
```

```
3F80: 00 F8 B4 00 84 7D AF B9   08 DE 67 FD 67 2E 67 2E   .....}...  ..g.g.g.
3F90: AD 37 F2 9B D3 DF AD FE   D3 01 AE FF 77 AF E9 89   .7......   ....w...
3FA0: BF 0F 97 F5 83 9A 1F B9   78 B1 FA 8A 20 0A 37 B2   ........   x... .7.
3FB0: BB A4 0F 46 B6 83 B9 78   F1 96 B1 9A 1F 23 17 04   ...F...x   .....#..
3FC0: FA F0 E7 03 40 F0 F6 C9   83 37 12 CA 65 E5 04 4B   ....@...   .7..e..K
3FD0: 29 28 29 AC AD F0 A1 18   19 EC D5 FD 83 F0 03 FE   )()......  ........
3FE0: 03 FC F6 E5 83 F9 04 FA   FF FF FF FF FF FF FF FF   ........   ........
3FF0: FF FF FF FF FF FF FF FF   FF FF FF FF FF FF FF FF   ........   ........

2000: 04 00 00 15 D5 E4 8A E4   BB B8 32 F0 12 F4 C8 F0   ........   ..2.....
2010: 53 E0 96 F4 B8 83 F0 96   F0 B8 34 F0 12 F0 B9 6C   S.......   ..4....l
2020: F1 96 38 F0 53 E3 A0 B8   6A F0 18 B0 00 18 A0 B8   ..8.S...   j.......
2030: 94 B9 0C B0 00 18 E9 33   B8 36 F0 32 41 B4 71 74   .......3   .6.2A.qt
2040: 00 B8 6A F0 C6 A1 94 00   F4 D6 F5 74 00 E5 23 40   ..j.....   ...t..#@
2050: 34 04 F6 A7 F5 94 F8 E5   F6 79 F0 D3 8B C6 75 D3   4.......   .y....u.
2060: 19 C6 75 D3 01 C6 75 D3   12 C6 77 D3 04 C6 77 D3   ..u...u.   ..w...w.
2070: 03 96 A1 84 81 44 00 24   C3 96 8A F0 D3 83 96 A1   .....D.$   ........
2080: F8 03 05 A8 F0 19 21 C9   04 9E F0 D3 87 96 99 18   ......!.   ........
2090: 18 F0 C8 C8 37 32 99 A4   00 B9 6B 27 21 19 A1 04   ....72..   ..k'!...
20A0: A7 B8 6B 27 A0 18 A0 F5   F4 A2 E5 F6 D1 96 41 B8   ..k'....   ......A.
20B0: 94 B9 53 23 0C F4 EC B8   34 F0 43 04 72 C0 53 7F   ..S#....   4.C.r.S.
20C0: A0 92 C9 B8 3A F0 53 7F   A0 B8 32 F0 53 BF 20 F7   ....:.S.   ..2.S. .
20D0: F7 B8 36 F0 B8 E8 72 DA   B8 FC 83 B8 83 A0 B8 32   ..6...r.   .......2
20E0: F0 12 F4 B9 39 23 15 E6   EC D1 96 ED A1 F5 A4 01   ....9#..   ........
20F0: F5 74 00 E5 E4 A0 B9 71   F1 96 FC 83 B1 00 04 A1   .t.....q   ........
2100: B8 00 24 0E BB 01 24 0E   BB 02 24 0E BB 03 B8 8A   ..$...$.   ..$.....
2110: 2B A0 18 FB A0 18 F9 A0   18 FA A0 B8 34 B0 BA B8   +.......   ........
2120: 72 B0 00 85 D4 69 B8 36   F0 37 72 59 B8 6B F0 C6   r....i.6   .7rY.k..
2130: 59 B8 A0 A0 18 B0 01 18   B0 82 F4 F2 F6 24 B8 78   Y.......   .....$.x
2140: B0 F3 F4 E6 E6 54 96 24   B8 78 F0 96 42 B8 72 10   .....T.$   .x..B.r.
2150: F0 12 24 83 F0 D3 06 96   24 B9 A1 B1 00 C9 B8 6B   ..$.....   $......k
2160: F0 18 C6 76 A1 19 B1 04   19 B1 09 19 F0 A1 19 B1   ...v....   ........
2170: FF 19 B1 FF 24 79 F0 A1   19 19 B8 8A F0 AA 18 96   ....$y..   ........
2180: 94 F0 AB BA 01 B1 47 FB   1B A3 C6 91 19 1A A1 24   ......G.   .......$
2190: 87 FA 24 98 23 03 F4 EC   B8 A1 F0 6A A0 D4 00 E6   ..$.#...   ...j....
21A0: A6 96 24 95 B6 24 83 44   3A 3E 01 02 43 00 33 34   ..$..$.D   :>..C.34
21B0: 35 37 38 39 30 2B 26 20   00 33 34 36 37 3A 3C 3D   57890+&    .3467:<=
21C0: 15 18 00 14 F6 F4 91 54   F4 F6 FD 23 80 34 04 F6   .......T   ...#.4..
21D0: FD B9 8E 23 02 F4 EC 23   82 34 04 F6 FD B9 AB F1   ...#...#   .4......
21E0: A0 18 B9 A5 F1 A0 18 B9   A7 F1 A0 18 B9 8E F1 A0   ........   ........
21F0: 18 19 F1 A0 18 B9 AA F1   A0 B8 A3 44 0E 04 A7 00   ........   ...D....
2200: 14 F6 F4 91 54 F4 F6 AE   23 A7 34 00 F6 AE F0 52   ....T...   #.4....R
2210: AE BE 10 18 F0 47 F7 F6   1F B9 34 F1 43 88 A1 18   .....G..   ..4.C...
2220: F0 B9 89 A1 18 18 F0 C8   F2 30 F6 67 D4 A3 44 67   ........   .0.g..Dg
2230: F1 37 92 2C B9 33 F1 12   2C B9 37 F1 37 92 41 D4   .7.,.3..   ,.7.7.A.
2240: A3 B8 A6 F0 03 F1 F6 53   18 F0 F7 96 53 B9 A8 F1   .......S   ....S...
2250: 37 52 67 BE 00 B8 36 F0   37 52 67 B8 34 F0 43 10   7Rg...6.   7Rg.4.C.
2260: A0 B8 3A F0 43 80 A0 B8   32 F0 12 AE 53 08 4E AE   ..:.C...   2...S.N.
2270: 18 F0 53 01 47 4E AE B9   3B F1 53 60 4E AE 37 B9   ..S.GN..   ;.S`N.7.
2280: 89 A1 92 8C F0 32 8B F4   7D 96 8C 1E FE A9 23 85   .....2..   }.....#.
2290: 34 08 B8 89 F0 92 A6 B8   33 F0 32 A0 F4 7D 96 A6   4.......   3.2.}..
22A0: 23 8E B9 0F 34 08 F5 54   BA E5 23 90 34 08 04 A7   #...4..T   ..#.4...
22B0: B8 8A A0 B8 8D A0 BA 01   12 BC BA 10 07 B8 69 B9   ........   ......i.
22C0: 62 D3 06 C6 D1 D3 06 C9   52 CE C9 32 CE C9 03 63   b.......   R..2...c
22D0: A8 F0 F4 2A F6 F2 29 AB   23 8B 29 A1 19 B1 00 FB   ...*..).   #.).....
22E0: A9 FA E7 AA F0 47 F4 2A   F6 F2 B8 8E A0 18 B0 00   .....G.*   ........
22F0: B8 8A F0 83 18 18 18 F0   C6 FB 37 F7 83 00 00 00   ........   ...7....
2300: 27 B8 8A A0 18 A0 B8 8A   F0 B8 37 12 19 32 1F B9   '.......   ..7..2..
2310: 34 F1 37 B2 93 C8 F0 64   1B F0 37 32 93 64 23 F0   4.7....d   ..72.d#.
2320: 37 52 93 B8 84 B0 BA D4   69 BA 03 B8 36 F0 37 72   7R......   i...6.7r
2330: 60 B8 8B F0 37 12 60 B8   A0 B0 F1 18 B0 05 18 B0   `...7.`.   ........
2340: 05 18 B0 83 18 B0 FF 18   B0 FF 18 B0 82 F4 F2 F6   ........   ........
2350: 27 B8 A2 B0 09 18 B0 F1   18 B0 FF 18 B0 FF BA 07   '.......   ........
2360: B9 A0 B1 F1 19 FA A1 69   07 07 A9 B8 8A F0 B8 24   .......i   .......$
2370: B1 44 12 7E B8 28 B1 45   32 7E B8 3D B1 42 19 23   .D.~.(.E   2~.=.B.#
```

```
2380: 02 F4 EC F4 F2 F6 27 B8   36 F0 37 72 93 B8 8B 10   ......'.  6.7r....
2390: F0 12 06 B8 8B B0 00 C8   10 F0 17 53 03 96 06 83   ........  ...S....
23A0: B8 8B B9 8E F0 A1 B8 43   F0 C6 E0 BA 00 03 F4 1A   .......C  ........
23B0: C6 C4 F6 AD CA 03 0C AB   27 03 05 EB B9 C6 C4 1A   ........  '.......
23C0: 37 17 03 3C B8 8C B9 8E   A0 C8 FA 37 17 61 A0 C9   7..<....  ...7.a..
23D0: F1 F6 DC 20 03 18 20 07   96 DC 23 07 C8 A0 D4 FA   ... .. .  ..#.....
23E0: 83 E7 BB 09 BC 19 EC E6   64 EC 12 F0 99 DF 64 F4   ........  d.....d.
23F0: 89 20 64 F4 77 00 BC 09   EC F8 EB EA 89 20 83 00   . d.w...  ..... ..
2400: B8 36 F0 B8 32 12 4F F0   53 9A 92 43 C6 43 D3 02   .6..2.O.  S..C.C..
2410: C6 43 D3 8A C6 43 D3 02   C6 43 F0 72 49 23 80 B9   .C...C..  .C.rI#..
2420: E5 B8 32 40 59 72 41 20   37 72 40 B9 6A F1 17 37   ..2@YrA   7r@.j..7
2430: AA BB 02 B9 7D F1 C6 3B   6A E6 3D FA A1 19 EB 35   ....}..;  j.=....5
2440: 83 A0 83 23 10 B9 75 84   21 23 08 B9 6D 84 21 F0   ...#..u.  !#..m.!.
2450: 37 32 5E 94 1D F0 43 02   A0 F4 6A 96 43 83 F4 6A   72^...C.  ..j.C..j
2460: 96 43 F6 68 74 A0 96 1D   B8 8A D4 DA C6 43 17 53   .C.ht...  .....C.S
2470: 07 96 74 17 54 B0 F6 7C   74 A0 96 1D FD C6 49 84   ..t.T..|  t.....I.
2480: 43 F4 91 54 F4 67 B8 89   A0 23 AE 34 00 F6 9A B8   C..T.g..  .#.4....
2490: A9 F0 B8 71 20 37 17 60   E6 9E 27 A0 84 FB B8 89   ...q 7.`  ..'....
24A0: F0 F2 F7 B8 AA F0 37 53   60 AB B8 AB F0 53 08 4B   ......7S  `....S.K
24B0: AB B8 AC F0 37 53 03 4B   AB 53 4A 96 C9 B8 A6 F4   ....7S.K  .SJ.....
24C0: 5B 18 F0 43 80 A0 C8 D4   A3 FB 53 21 96 D4 B8 A3   [..C....  ..S!....
24D0: F4 57 D4 A3 B8 32 F0 12   F7 53 08 AA 18 B9 3B F1   .W...2..  .S....;.
24E0: 53 40 4A AA FB 72 EC F0   53 02 4A AA F0 E7 E7 53   S@J..r..  S.J....S
24F0: 10 4A A9 23 85 34 08 B8   71 F0 17 B8 6C A0 04 A7   .J.#.4..  q...l...
2500: F4 91 54 F4 F6 6F 23 B9   34 00 F6 6F F8 AB 18 F4   ..T..o#.  4..o....
2510: 57 D4 A3 FB 03 04 A8 F4   5B 18 F0 43 80 A0 C8 D4   W.......  [..C....
2520: A3 FB 03 07 A8 F0 53 80   A9 47 49 B8 34 40 A0 B9   ......S.  .GI.4@..
2530: 36 F1 37 52 46 FB 03 08   A9 F1 53 80 A9 47 E7 40   6.7RF...  ..S..G.@
2540: A0 B8 3A F0 49 A0 F4 7D   BA 20 C6 4E BA 00 B8 32   ..:.I..}  . .N...2
2550: F0 12 6F 53 98 A9 18 F0   53 06 4A AA B8 3B F0 53   ..oS....  S.J..;.S
2560: 60 49 A9 23 85 34 0C F5   54 BA E5 23 90 34 08 04   `I.#.4..  T..#.4..
2570: 99 B8 34 F0 37 BA 01 B2   7C D2 7C CA 27 AD AE FA   ..4.7...  |.|.'...
2580: B4 E1 96 8E B8 3D F0 B4   E1 18 F0 C8 B4 E1 65 FA   .....=..  ......e.
2590: 74 E1 96 9B F0 74 E1 18   F0 74 E1 FE 74 E1 FD 74   t....t..  .t..t..t
25A0: E1 FA C6 CE B8 01 F5 F4   7F E5 E6 DB A0 18 F3 03   ........  ........
25B0: FB E6 A6 27 AD AE B8 01   20 B4 E1 A9 18 F3 03 FB   ...'....   .......
25C0: F9 E6 B8 FD 4E 96 DB 23   02 A8 B9 3D F4 EC BA 20   ....N..#  ...=... 
25D0: 55 B8 34 F0 53 9F 4A A0   99 8F 83 89 40 BA 00 A4   U.4.S.J.  ....@...
25E0: D0 AF B9 08 DE 67 FD 67   2E 67 2E AD 37 F2 F6 D3   .....g.g  .g..7...
25F0: DF AD FE D3 01 AE FF 77   AF E9 E4 8F 0F 83 00 00   .......w  ........
2600: F4 F2 F6 1F B8 6B F0 B8   78 B0 F8 C6 0F B0 D0 F4   .....k..  x.......
2610: E6 E6 20 96 1F B8 78 F0   96 0F 27 B9 79 B1 00 83   .. ...x.  ..'.y...
2620: F8 AA B9 6B F1 96 31 B9   6C F1 B9 A0 D1 96 65 C4   ...k..1.  l.....e.
2630: 4B 19 F0 D3 09 96 60 18   F0 17 96 65 18 F0 17 C6   K.....`.  ...e....
2640: 4A 07 D1 96 60 18 F0 17   96 65 18 97 F0 D3 06 96   J...`...  .e......
2650: 55 18 F0 C4 18 B9 6B F1   C6 65 A7 F0 D3 15 C6 1A   U.....k.  .e......
2660: FA A8 F0 F4 F8 97 A7 FF   83 F4 E0 B8 84 B9 32 F1   ........  ......2.
2670: B9 34 41 12 8F B9 38 F1   67 B9 30 F1 47 5F D3 0C   .4A...8.  g.0.G_..
2680: C6 91 D3 0C E6 87 27 AA   19 F1 53 E0 4A C6 91 E4   ......'.  ..S.J...
2690: A0 F0 96 99 B8 6C A0 04   D0 B8 79 F0 96 69 B8 75   .....l..  ..y..i.u
26A0: B0 FF 83 B9 8A 23 02 F4   EC C9 F1 53 7F 21 B8 9B   .....#..  ...S.!..
26B0: F2 B4 B8 95 F1 C9 96 BD   F1 03 F1 E6 C7 C8 F0 03   ........  ........
26C0: 01 A0 18 F0 13 00 A0 18   F5 D4 E0 E5 E6 D9 D4 D3   ........  ........
26D0: 18 B9 6B F1 A0 18 19 F1   A0 83 B9 3D F1 47 53 07   ..k.....  ...=.GS.
26E0: C6 F8 A0 18 F1 BA 80 F4   2A F6 F8 A0 18 19 F1 A0   ........  *.......
26F0: 03 C4 F6 F8 C3 C8 F0 83   27 83 B8 8A B9 8D F4 42   ........  '......B
2700: C6 1A AC B8 90 D4 DA C6   20 B9 8A F4 42 AB B8 90   ........   ...B...
2710: B9 8D F4 42 2C 12 22 FB   12 1D 23 FF 83 FC 12 1A   ...B,."   ..#.....
2720: 27 83 FB 12 20 FC 12 1A   E4 20 97 A7 5F C6 41 AB   '... ...  . .._.A.
2730: 03 F4 E6 37 96 41 AB FA   51 C6 3F FB 03 0C AB FB   ...7.A..  Q.?.....
2740: 97 83 BA 03 F0 37 61 F6   51 17 96 54 18 19 EA 44   .....7a.  Q..T...D
2750: 83 23 01 83 23 02 83 B9   94 E4 5D B9 9A F0 07 F2   .#..#...  ..].....
2760: 68 61 A1 19 F1 13 00 A1   18 83 B8 8A D4 DA BD 01   ha......  ........
2770: C6 7C 54 B0 AD F6 7C D4   FA 97 BD 00 83 B8 6B B9   .|T...|.  ......k.
2780: 51 F0 D1 96 89 18 19 F0   D1 83 B8 3B 20 43 80 20   Q.......  ...; C. 
2790: 93 B9 32 F1 43 40 A1 83   00 00 00 00 00 00 04 09   ..2.C@..  ........
```

```
27A0: 89 88 00 00 00 00 F5 04   00 89 88 00 00 00 00 F5   ........ ........
27B0: 24 00 89 88 00 00 00 94   00 E4 B2 D5 B8 73 B0 01   $....... .....s..
27C0: 89 88 00 00 00 00 93 89   88 00 00 00 00 83 89 88   ........ ........
27D0: 00 00 89 88 00 00 89 88   00 00 89 88 00 00 00 00   ........ ........
27E0: 89 88 00 00 00 00 89 88   00 00 00 00 89 88 00 00   ........ ........
27F0: 00 00 89 88 00 00 00 00   89 88 00 00 00 00 00 00   ........ ........
2800: B8 6B B9 8E F0 A1 18 19   F0 A1 54 AF C6 FC B8 32   .k...... ..T....2
2810: F0 12 FC B8 6C B9 90 F1   A0 C8 B0 00 07 C8 D0 96   ....l... ........
2820: 2C B8 39 F0 BB 5B 96 37   BB 50 04 37 B8 6B F1 A0   ,.9..[.7 .P.7.k..
2830: 18 19 F1 A0 19 F1 AB B8   6C F0 E5 F4 C7 F5 AA B9   ........ l.......
2840: 01 FB 5F 96 47 B9 11 F9   F4 00 C6 0E 27 20 B2 5B   .._.G... ....' .[
2850: B8 6B F0 C6 0A B0 00 18   A0 54 AF B8 32 F0 12 FC   .k...... .T..2...
2860: B8 6C F0 C6 0E 07 A0 C6   0E 23 F2 F4 00 C6 73 27   .l...... .#....s'
2870: 20 B2 0E 23 40 E5 34 04   F5 F6 5B 18 18 18 20 B9    ..#@.4. ..[... .
2880: 89 A1 F0 D3 8B C6 B8 D3   19 C6 B8 D3 01 C6 B8 D3   ........ ........
2890: 12 C6 B8 D3 04 C6 B8 D3   03 C6 CA D3 01 C6 DC D3   ........ ........
28A0: 04 96 0E C8 F0 53 01 A1   94 F8 E6 0E 96 0E B8 A8   .....S.. ........
28B0: F0 B8 91 A0 BB 10 44 1A   94 F8 E6 BE C6 0E 23 80   ......D. ......#.
28C0: E5 34 04 F5 F6 5B BB 00   44 07 94 F8 E6 D0 C6 0E   .4...[.. D.......
28D0: 23 AE E5 34 00 F5 BB C0   23 03 04 F6 C8 F0 37 32   #..4.... #.....72
28E0: 0E 94 F8 E6 0E C6 0E 23   B9 E5 34 00 F5 F0 18 B9   .......# ..4.....
28F0: 93 A1 BB 50 23 03 F6 5B   68 A9 44 00 44 A7 00 00   ...P#..[ h.D.D...
2900: B8 36 F0 37 12 DE B8 38   F0 32 DE B8 89 27 A0 18   .6.7...8 .2...'..
2910: A0 18 A0 B8 83 B0 F4 34   F9 B8 83 F0 C6 CF E5 F4   .......4 ........
2920: E0 F5 B8 8A F0 AD 18 F0   17 47 AB F0 B9 69 B8 62   ........ .G...i.b
2930: D3 06 C6 40 D3 06 C8 52   3D C8 32 3D C8 03 63 A9   ...@...R =.2=..c.
2940: F8 AE BC 02 FB 92 4A FC   47 AC FD 12 57 FC 77 AC   ......J. G...W.w.
2950: F1 F4 E5 43 02 24 5C F1   47 F4 E5 17 29 AD F9 E5   ...C.$\. G...)...
2960: F4 CE F5 F4 F4 C6 C1 F0   B8 8A F2 CF D2 84 37 B2   ........ ......7.
2970: 19 12 79 F0 17 53 01 24   12 B0 00 18 10 F0 D3 07   ..y..S.$ ........
2980: 96 13 24 12 52 A9 FE A9   18 F0 C6 13 12 99 C9 F1   ..$.R... ........
2990: 47 5F 19 21 53 F0 41 24   9E F1 5F AA 47 4A A1 F0   G_.!S.A$ .._.GJ..
29A0: 03 63 A9 07 A8 F0 A1 24   BB FD A9 F0 12 B4 F1 34   .c.....$ .......4
29B0: E8 31 24 BB F1 47 34 E8   47 31 A1 B8 89 B0 01 24   .1$..G4. G1.....$
29C0: 13 F0 53 E0 C6 19 B8 8B   F0 03 63 A9 27 24 BA B8   ..S..... ..c.'$..
29D0: 89 F0 C6 DE B8 70 B0 5A   23 11 E5 F4 DA F5 27 B8   .....p.Z #.....'.
29E0: 83 A0 B8 31 A0 E5 E4 B2   5F 17 AB 03 F4 E6 F7 C6   ...1.... _.......
29F0: F2 83 FE A8 F0 DC A0 FB   83 B8 31 27 A0 83 00 00   ........ ..1'....
2A00: B4 49 C6 1A 67 44 12 F0   18 03 F1 F6 11 F0 F7 C6   .I..gD.. ........
2A10: 1A F0 BA 0E F2 1C BA 0A   44 1C BA 00 B8 89 F0 C6   ........ D.......
2A20: 23 BA 0B FA 4B 2B D3 10   96 3A B8 6C F0 B8 51 D0   #...K+.. .:.l..Q.
2A30: 96 34 54 A0 B8 92 FB A0   44 5A 94 F8 E6 52 FB 53   .4T..... DZ...R.S
2A40: F0 D3 50 C6 52 B8 51 F0   D1 96 5A 19 B8 93 F0 D1   ..P.R.Q. ..Z.....
2A50: 44 56 E5 F4 7D F5 96 5A   54 A0 BE 23 FB C6 6A CE   DV..}..Z T..#..j.
2A60: 53 F0 C6 6A CE FB 5F C6   6A CE B8 6C F0 E5 F4 C7   S..j.._. j..l....
2A70: F5 AA FE 47 F4 00 B8 7A   B0 01 F4 03 96 85 B8 7A   ...G...z .......z
2A80: F0 96 7A 04 5B 27 20 B2   9E 94 F8 E6 83 96 83 B8   ..z.[' . ........
2A90: 2F F0 53 F0 D3 10 96 83   B8 6C F0 B8 90 A0 04 0E   /.S..... .l......
2AA0: FB 53 F0 43 0F AB 83 23   F0 F4 00 B0 00 44 A7 B8   .S.C...# .....D..
2AB0: 6A F0 B8 90 A0 10 18 B0   00 83 B8 36 F0 32 FB B8   j....... ...6.2..
2AC0: 3A F0 53 03 03 7F 53 80   A9 F0 53 0C 03 3C 53 40   :.S...S. ..S..<S@
2AD0: 49 A9 F0 53 10 E7 49 A9   F0 53 0A C6 E1 F9 43 10   I..S..I. .S....C.
2AE0: A9 B8 77 F0 5F D3 07 C6   FA B8 3C F0 53 30 E7 E7   ..w_.... ..<.S0..
2AF0: AA 37 59 2A 4F B8 2D 50   4A A0 83 88 2D F0 A9 83   .7Y*O.-P J...-...
2B00: D4 00 D4 77 B8 36 F0 32   8A D4 3C 94 93 74 FB F4   ...w.6.2 ..<..t..
2B10: BC B4 C8 54 BA B8 53 B9   8A 23 04 E5 F4 EC B8 59   ...T..S. .#.....Y
2B20: B9 8E F4 EC F5 B8 30 F0   37 53 03 AB B8 35 F0 53   ......0. 7S...5.S
2B30: 02 4B AB 37 12 38 74 78   FB 37 32 3E 74 7C B8 3B   .K.7.8tx .72>t|.;
2B40: B9 32 F1 92 6A F2 71 F0   B2 61 D2 58 B8 8A B9 8E   .2..j.q. .a.X....
2B50: B4 57 C6 88 12 88 E6 61   FB 32 88 23 40 74 83 84   .W.....a .2.#@t..
2B60: 48 FB 12 88 23 20 74 83   A4 89 F0 B2 61 74 7C 64   H...# t. ....at|d
2B70: 4C F0 D2 58 74 78 64 4C   B8 8A 64 7E B8 8E 27 A0   L..Xtxdl ..d~..'.
2B80: 18 A0 83 B8 3B 50 96 90   E4 2D B8 3A F0 53 E0 A0   ....;P.. .-.:.S..
2B90: 83 AC 37 17 AD 19 F1 53   7F AE C9 41 96 A5 FB 28   ..7....S ...A...(
2BA0: B0 00 28 64 E3 FE 96 AE   F1 6D F6 AE FC A1 D4 E0   ..(d.... .m......
2BB0: 2B 28 2B F2 B8 2A C6 C0   B0 7F E6 E0 B0 80 64 E0   +(+..*.. ......d.
```

```
2BC0:  F0 F2 DA FA E6 C8 37 17   20 AA 60 20 D0 37 F2 E0    ......7.   . ` .7..
2BD0:  FA D0 37 F2 E0 F0 F7 A7   64 B8 F6 C3 FA C6 E0 A0    ..7.....   d.......
2BE0:  F8 2B A8 F0 A1 18 19 F0   A1 FB A8 97 A7 F1 53 7F    .+......   ......S.
2BF0:  C9 96 F9 F1 6D F6 F9 B0   00 F0 83 B8 37 B9 2A F0    ....m...   ....7.*.
2C00:  37 72 0A B8 3B F0 53 60   96 13 27 A1 19 A1 B8 2C    7r..;.S`   ..'....,
2C10:  A0 84 32 B8 55 B2 19 B8   5B 23 14 BB 2C 74 91 E6    ..2.U...   [#..,t..
2C20:  39 F2 39 B8 35 F0 43 80   20 B8 81 F2 2F B0 74 F0    9.9.5.C.    .../.t.
2C30:  96 38 B8 35 F0 53 73 A0   83 B8 3B F0 53 60 47 E7    .8.5.Ss.   ..;.S`G.
2C40:  B8 35 20 53 7F 40 A0 83   B8 3A F0 53 FC A0 B9 3C    .5 S.@..   .:.S...<
2C50:  F1 AA 37 52 59 F4 34 E4   38 23 05 F4 D9 E6 61 E4    ..7RY.4.   8#....a.
2C60:  2D 23 0F F4 D9 F6 7B 23   40 D4 B1 96 92 F0 52 77    -#....{#   @.....Rw
2C70:  B9 7F F1 96 92 B1 BA F0   43 14 A0 FA 72 57 B9 35    ........   C...rW.5
2C80:  F1 72 92 23 14 F4 D9 F6   92 B9 7F F1 96 92 F0 43    .r.#....   .......C
2C90:  18 A0 83 B8 3C F0 AD B8   41 F0 5F C6 A9 94 CF C6    ....<...   A._.....
2CA0:  AD F6 A9 FD 43 94 AD 84   AD FD 53 FB AD B8 41 F0    ....C...   ..S...A.
2CB0:  47 5F C6 C0 94 CF C6 C4   F6 C0 FD 43 98 AD 84 C4    G_......   ...C....
2CC0:  FD 53 F7 AD FD 53 0C 96   CA AD B8 3C FD A0 83 B8    .S...S..   ...<....
2CD0:  20 B9 BC BA 02 BB 32 BC   F6 84 DB 29 6B 2A 13 00     .....2.   ...)k*..
2CE0:  2A E9 DC B9 8A A1 19 FA   A1 C9 D4 E0 2A 96 F7 67    *.......   ....*..g
2CF0:  2A 6C FA F7 12 F7 27 83   B9 36 F1 47 F7 B9 6B F1    *l....'.   .6.G..k.
2D00:  83 B8 32 F0 37 47 B8 36   50 32 26 B8 3B F0 53 60    ..2.7G.6   P2&.;.S`
2D10:  96 35 B8 52 F0 C6 26 B9   35 F1 43 40 21 B9 82 D2    .5.R..&.   5.C@!...
2D20:  23 B1 E8 F1 96 32 27 B8   51 A0 13 A0 B8 35 F0 53    #....2'.   Q....5.S
2D30:  BF A0 E5 04 F0 B8 5E D2   3B B8 58 F0 C8 C6 26 B9    ......^.   ;.X...&.
2D40:  51 23 02 E5 F4 EC F5 A4   32 F0 41 C6 7C F0 37 61    Q#......   2.A.|.7a
2D50:  17 BA 00 BC 04 A4 69 F0   41 96 63 18 19 F0 41 C8    ......i.   A.c...A.
2D60:  C9 C6 7C BC 02 D4 E0 18   19 18 19 4A 96 70 D4 E0    ..|.....   ...J.p..
2D70:  FC 52 7C E6 77 F9 A8 C8   F0 C6 7D FC 83 67 AC C8    .R|.w...   ..}..g..
2D80:  B9 42 F1 37 60 FC F7 17   83 B8 3A F0 53 F3 A0 23    .B.7`...   ..:.S..#
2D90:  05 F4 D5 E6 97 E4 2D 23   0F F4 D5 F6 B1 23 20 D4    ......-#   .....# .
2DA0:  B1 96 C5 F0 12 AD B9 7F   F1 96 C5 B1 BA F0 43 11    ........   ......C.
2DB0:  A0 B9 35 F1 52 C5 23 14   F4 D5 F6 C5 B9 7F F1 96    ..5.R.#.   ........
2DC0:  C5 F0 43 12 A0 83 E4 38   B8 85 F0 96 F5 B8 3A B9    ..C....8   ......:.
2DD0:  30 F1 52 F6 B9 32 F1 37   72 F1 F0 5F 96 F1 B9 36    0.R..2.7   r.._...6
2DE0:  F1 37 52 E7 F0 F2 F1 B9   52 F1 96 F1 F0 53 EF A4    .7R.....   R....S..
2DF0:  F4 F0 43 10 A0 83 B9 34   F1 F2 F1 A4 DA 00 00 00    ..C....4   ........
2E00:  F4 57 B8 35 B9 3A C6 1B   E6 13 F0 53 FE A0 F1 43    .W.5.:..   ...S...C
2E10:  20 C4 1A F0 43 01 A0 F1   53 DF A1 F0 12 2E B8 30     ...C...   S......0
2E20:  F0 37 32 2E B8 32 F0 92   2E B8 36 40 F2 35 B8 35    .72..2..   ..6@.5.5
2E30:  F0 43 02 C4 3A B8 35 F0   53 FD A0 83 B9 3B F1 AD    .C..:.5.   S....;..
2E40:  B8 44 B2 4F D2 48 C4 72   B9 F4 BA 01 F0 C4 55 B9    .D.O.H.r   ......U.
2E50:  96 BA 00 F0 47 5F C6 72   B8 20 BB 32 94 DB FD B2    ....G_.r   . .2....
2E60:  70 E6 72 B8 86 F0 96 6F   B8 39 F0 96 6F B0 85 83    p.r....o   .9..o...
2E70:  E6 63 B8 86 B0 16 83 B8   36 F0 AD 37 B8 33 32 83    .c......   6..7.32.
2E80:  F0 52 9C C8 F0 37 F2 8C   FD 37 92 9C B9 3B F1 37    .R...7..   .7...;.7
2E90:  4D D2 96 F0 72 9C F4 5B   C6 B0 F6 AA B8 33 F0 43    M...r..[   .....3.C
2EA0:  01 A0 FD 32 B0 F0 43 05   C4 AF B8 33 F0 53 FA A0    ...2..C.   ...3.S..
2EB0:  83 AC C6 C7 B8 7E B2 B9   C8 B9 32 F1 53 FB 21 37    .....~..   ..2.S.!7
2EC0:  52 C4 B0 00 F0 96 DF B8   3B F0 53 9F 4C 20 D0 5C    R.......   ;.S.L .\
2ED0:  C8 C6 DF 94 F8 23 D1 F6   DB 23 F4 B9 7F A1 27 83    .....#..   .#....'.
2EE0:  F0 37 61 37 AA 18 19 F0   37 71 37 2A C3 C9 F6 F1    .7a7....   7q7*....
2EF0:  83 37 03 01 2A 37 13 00   2A 97 A7 83 00 00 00 00    .7..*7..   *.......
2F00:  E5 F4 CE E5 F4 E0 F4 D2   F5 B8 30 F0 47 5F C6 20    ........   ..0.G_.
2F10:  B9 6D D1 5F 96 20 18 F0   F2 1D 53 60 83 27 A0 83    .m._. ..   ..S`.'..
2F20:  B8 8E B9 6B F0 A1 18 19   F0 A1 E5 E4 A9 F4 34 F4    ...k....   ......4.
2F30:  38 27 C4 B1 23 05 E4 3A   23 0A B8 3A 50 C6 56 D0    8'..#..:   #..:P.V.
2F40:  A0 18 F0 53 60 B8 7F B0   8C C6 56 C8 B2 4F C8 B9    ...S`...   ..V..O..
2F50:  6A F1 37 03 8C A0 83 B8   3F E4 5D B8 40 B9 36 F1    j.7.....   ?.].@.6.
2F60:  32 67 B9 37 F1 32 70 B9   35 F1 B2 70 F8 97 A7 83    2g.7.2p.   5..p....
2F70:  F0 C6 6C B8 24 B9 00 BA   00 BB 32 BC F6 84 DB BE    ..l.$...   ..2.....
2F80:  00 09 37 B2 89 EE 81 97   83 BE 11 EE 8B BE 80 09    ..7.....   ........
2F90:  47 67 67 FE 67 BE 09 EE   97 AE E6 8F 09 B2 A0 97    Ggg.g...   ........
2FA0:  FE 83 B8 6C F0 C6 AB 07   A0 96 B5 C8 F0 C6 B5 B0    ...l....   ........
2FB0:  00 18 A0 E4 A4 A9 B8 32   F0 67 F9 83 B8 33 B9 38    .......2   .g...3.8
2FC0:  F1 37 B2 D0 B9 3A F1 53   0C C6 D0 F0 43 02 E4 D3    .7...:.S   ....C...
2FD0:  F0 53 FD A0 83 B9 56 E4   DB B9 5C A8 F1 97 96 E4    .S....V.   ..\.....
2FE0:  C9 F1 37 6B 83 5F 03 00   57 AA F0 5C C6 F1 23 14    ..7k._..   W..\..#.
2FF0:  83 23 18 83 B8 31 F0 77   77 D0 37 53 03 83 FF FF    .#...1.w   w.7S....
```

What is claimed as new and what is desired to be secured by Letters Patent of the United States is:

1. In a system for monitoring and controlling the condition of air in each of a plurality of zones when using a unit operating in a heating or cooling mode and having a fan to supply heated or cooled conditioned air to each zone via a main duct and secondary ducts through a zone damper means in zone ducts communicating with each zone and operated by a damper control means, at least one said zone having zone heating means controlled by said damper control means, means for controlling and coordinating the operation of said unit with said damper control means and respective said zone damper means and respective said zone heating means, said means comprising a programmable system controller means receiving information from each said damper controller means, said system controller means including program means such that said unit is operable only in preselected allowable modes during respective distinct time periods and inoperable in such preselected modes in other time periods, means for determining the condition of air in each said zone and supplying such information to said programmable system controller means, said system controller means operating said unit in accordance with its programming, the condition of air in each zone and in accordance with information received from each damper controller means to control said unit in said preselected allowable modes during respective distinct time periods.

2. In the system as defined in claim 1 wherein said damper controller means includes a zone thermostat, said means for determining the condition of air in each zone including a first sensor for determining the temperature of the air in its respective said zone, said first sensor providing electrical signals to said thermostat indicative of the temperature of the air in respective said zone.

3. In the system as defined in claim 2 wherein said zone thermostat includes means for establishing the desired temperature in respective said zone.

4. In the system as defined in claim 3 wherein said system controller receives data indicative of the real time.

5. In the system as defined in claim 4 wherein said system controller means has first program means such that said unit is to be operated only in the cooling mode during a first preselected time period.

6. In the system as defined in claim 5 wherein during said first time period said system controller means determines the demand for cooling from all said zones, determines the number of zones having demand for cooling, compares such number with a preselected number defining the system mode demand number, and if the number of zones demanding cooling equals or exceeds said system mode demand number, said system controller means selects the cooling mode of said unit and provides output signals to said zone thermostat for operating said damper means, said system controller means thereafter activates said unit in the cooling mode until all said zone thermostats demanding the cooling mode have been substantially satisfied and then deactivates said unit.

7. In the system as defined in claim 6 wherein said system controller means selects the zone with the greatest demand as a reference zone and activates said unit in the cooling mode until said reference zone is substantially satisfied.

8. In the system as defined in claim 7 wherein said system controller means periodically determines the demand from each zone and, if the demand in another said zone having a demand for cooling is greater than said reference zone, said other zone is selected as a new reference zone and said unit is operated until demand in said new reference zone is substantially satisfied.

9. In the system as defined in claim 8 wherein said system controller means has second program means such that when cooling demand in said reference zone exceeds a first predetermined value, said system controller means will provide an output signal to said unit for increasing the cooling supplied to said reference zone by said unit.

10. In the system as defined in claim 9 wherein said system controller means has third program means for monitoring the temperature trend in said reference zone such that said system controller means will not provide an output signal to said unit for increasing the cooling supplied to said reference zone when the temperature trend in said reference zone indicates that the cooling demand of said reference zone is being substantially satisfied.

11. In the system as defined in claim 2 wherein said system controller includes a second sensor for determining the temperature of outside air.

12. In the system as defined in claim 11 wherein said system controller means has first program means such that when said system controller receives a signal from said second sensor indicating outside air temperature is greater than a predetermined value, said system controller means sends output signals to said zone thermostats to maintain said zone heating means in off condition even if demand therefor is called for by any respective said zones.

13. In the system as defined in claim 5 wherein said system controller means has second program means such that said unit is operated in the cooling or heating mode during a second preselected time period.

14. In a system as defined in claim 13 wherein said system controller means determines the demand for heating or cooling from all zones, determines the number of zones having a demand for heating or cooling, compares such number with a preselected number defining the system mode demand number, and if the number of zones demanding heating or cooling equals or exceeds said system mode demand number, said system controller means selects the desired heating or cooling mode respectively of said unit and provides output signals to said damper controller means for operating respective said damper means in a mode coincident with the desired mode of said unit, said system controller means thereafter activates said unit in the selected mode until all said zones demanding the selected mode have been substantially satisfied and then deactivates said unit.

15. In the system as defined in claim 14 wherein said system controller means compares the number of zones having a demand for heating and cooling and if the number of zones having a demand for heating is equal to the number of zones having demand cooling and the numbers equal or exceed said system mode demand number, said system controller means selects the zone with the greatest demand as a reference zone and activates said unit in the mode coincident to that demanded by said reference zone until said reference zone is substantially satisfied.

16. In the system as defined in claim 14 wherein said system controller means periodically determines the demand from each zone and, if the demand in another said zone, having a demand coincident with the mode in which said unit is activated, is greater than said reference zone, said other zone is selected as a new reference zone and said unit is operated until demand in said new reference zone is substantially satisfied.

17. In the system as defined in claim 16 wherein said system controller means has third program means such that when heating or cooling demand in the reference zone exceeds a first predetermined value, said system controller means will provide an output signal to said unit for increasing the heating and cooling supplied to said reference zone by said unit.

18. In the system as defined in claim 17 wherein said system controller means has fourth program means for monitoring the temperature trend in said reference zone such that said system controller means will not provide an output signal to said unit for increasing the cooling or heating supplied to said reference zone when the temperature trend in said reference zone indicates that the heating or cooling demand of said reference zone is being substantially satisfied.

19. In the system as defined in claim 18 wherein said system controller means has fifth program means for selecting the heating sources that are available for heating in said second preselected time period, said heating sources selectable being the heating source of said unit, or said zone heating means, or the heating source of said unit and said zone heating means.

20. In the system as defined in claim 1 wherein said system controller means has first program means for controlling said fan such that said fan is activated whenever any said zone heating means is activated by respective said damper control means.

21. In the system as defined in claim 14 wherein said system controller means has third program means for determining if said unit is to be selected for operation in the heating mode such that when any said zone heating means has been activated on, by respective damper control means, said zone is defined to be demanding heat regardless of the temperature of air in said zone and respective desired temperature in said zone.

22. In the system as defined in claim 5 wherein said system controller means has third program means such that said unit can be operated only in the heating mode during a third preselected time period.

23. In a system as defined in claim 22 wherein said system controller means determines the demand for heating from all zones, determines the number of zones having a demand for heating, compares such number with a preselected number defining the system mode demand number, and if the number of zones demanding heating equals or exceeds said system mode demand number, said system controller means selects the heating mode of said unit and provides output signals to said zone thermostat for operating said damper means, said system controller means thereafter activates said unit in the heating mode until all zone thermostats demanding the heating mode have been substantially satisfied and then deactivating said unit.

24. In the system as defined in claim 23 wherein said system controller means selects the zone with the greatest demand as a reference zone and activates said unit in the heating mode until said reference zone is substantially satisfied.

25. In the system as defined in claim 24 wherein said system controller means periodically determines the demand from each zone and, if the demand in another zone having a demand for heating is greater than said reference zone, said other zone is selected as a new reference zone and said unit is operated until demand in said new reference zone is substantially satisfied.

26. In the system as defined in claim 25 wherein said system controller means has fourth program means such that when heating demand in the reference zone exceeds a first predetermined value, said system controller means will provide an output signal to said unit for increasing the heating supplied to said reference zone by said unit.

27. In the system as defined in claim 26 wherein said system controller means has fifth program means for monitoring the temperature trend in said reference zone such that said system controller means will not provide an output signal to said unit for increasing the heating supplied to said reference zone when the temperature trend in said reference zone indicates that the heating demand of said reference zone is being substantially satisfied.

28. In the system as defined in claim 27 wherein said system controller means has sixth program means for selecting the heating sources that are available for heating in said third preselected time period, said heating sources selectable being the heating source of said unit or the heating source of said unit and said heating zone means.

29. In the system as defined in claim 27 wherein said system controller means has sixth program means for operating said damper means such that when said unit is being operated in the heating mode said system controller means will provide an output signal to said damper control means for operating said respective damper means to its maximum air flow position.

30. In the system as defined in claim 23 wherein said system controller means has fourth program means for determining if said unit is to be selected for operation in the heating mode such that when any zone heating means has been activated on by said damper control means, said zone is defined to be demanding heat regardless of the temperature of air in said zone and respective desired temperature in said zone.

31. In the system as defined in claim 1 further including a first sensor located in said main duct, said first sensor for determining the temperature of air in said duct provided from said unit and providing an output signal to said system controller means, said system controller means de-energizing the heating of said unit if said air temperature exceeds predetermined setpoints established by said system controller means.

32. In the system as defined in claim 1 wherein said system controller means includes indicating means for providing data indicative of the information associated with the operation of said system controller means.

33. In the system as defined in claim 4 further including at least one fan-powered mixing box assembly in a said secondary duct controlled by a mixing box control means for supplying heated or cooled conditioned air to a plurality of second zones, said mixing box control means receiving information for determining the condition of the air in each said second zone and the demand for heating or cooling in all said second zones and selecting the heating or cooling mode of said fan-powered mixing box, said system controller means having a first program means for operating said unit such that said unit is to be operated only in the cooling mode during a first preselected time period, operated in the heating or cooling mode during a second preselected time period, and operated only in the heating mode during a third preselected time period, said system controller means further having a second program means for determining, in said first preselected time period, the number of zones having a demand for cooling and defining such zones as first cooling callers, and determining if any said fan-powered mixing box has been selected to operate in the cooling mode during said first preselected time period, said second zones of said corresponding fan-powered mixing box that are demanding cooling being defined as second zone cooling callers, such that if the total number of said first and second zone cooling callers equals or exceeds a preselected number defining the system mode demand number said system controller means selects the cooling mode of said unit and provides output signals to said zone thermostats and said mixing box control means indicative of the selected mode of said unit, said system controller means thereafter activates said unit in the selected mode until all zones, including said second zones, demanding the selected mode of said unit have been substantially satisfied and then deactivates said unit.

34. In the system as defined in claim 33 wherein said system controller means has a third program for determining, during said second preselected time period, the number of zones having a demand for heating or cooling and defining such zones as zone heating or zone cooling callers, respectively, and determining if any said fan-powered mixing box has been selected to operate in either the heating or cooling mode during said second preselected time period, each said second zone of said corresponding fan-powered mixing box that is demanding a mode coincident with the operating mode of such respective said fan-powered mixing box being defined as a second zone heating or cooling caller, respectively, such that if the total number of said first and second zone heating or cooling callers equals or exceeds a preselected number defining the system mode demand number said system controller means selects the corresponding heating or cooling mode, respectively, of said unit and provides output signals to said zone thermostats and said mixing box control means indicative of the selected mode of said unit, said system controller means thereafter activates said unit in the selected mode until all zones, including said second zones, demanding the selected mode of said unit have been substantially satisfied and then deactivates said unit.

35. In the system as defined in claim 34 wherein said system controller means has a fourth program means for determining, during said third preselected time period, the number of zones having a demand for heating and defining such zones as zone heating callers and determining if any said fan-powered mixing box has been selected to operate in the heating mode during said second preselected time period, said second zones of said corresponding operating fan-powered mixing box that are demanding heating being defined as second zone heating callers, such that if the total number of said first and second zone heating callers equals or exceeds a preselected number defining the system mode demand number, said system controller means selects the heating mode of said unit and provides output signals to said zone thermostats and said mixing box control means indicative of the selected mode of said unit, said system controller means thereafter activates said unit in the selected mode until all zones having zone callers, including said second zones, demanding the selected mode of said unit have been substantially satisfied and then deactivates said unit.

36. In the system as defined in claim 35 wherein said system controller means monitors all zone callers, including said second zones, during each said preselected time period and selects the respective zone caller with the greatest demand as a reference zone and activates said unit in the respective heating or cooling mode until said reference zone is substantially satisfied.

37. In the system as defined in claim 36 wherein said system controller means periodically determines the demand from all zone callers and, if the demand in another zone having a demand coincident with the selected mode of said unit is greater than said reference zone, said other zone is selected as a new reference zone and said unit is operated until demand in said new reference zone is substantially satisfied.

38. In the system as defined in claim 36 wherein said system controller means has a fifth program means such that when cooling demand in the reference zone exceeds a first predetermined value during said first time period said system controller means will provide an output signal to said unit for increasing the cooling supplied to said reference zone by said unit.

39. In the system as defined in claim 38 wherein said system controller means has a sixth program means for monitoring the temperature trend in said reference zone such that said system controller means will not provide an output signal to said unit for increasing the cooling supplied to said reference zone when the temperature trend in said reference zone indicates that the cooling demand of said reference zone is being substantially satisfied.

40. In the system as defined in claim 36 wherein said system controller means has a fifth program means such that when heating or cooling demand in the reference zone exceeds a first predetermined value during said second time period, said system controller means will provide an output signal to said unit for increasing the respective heating or cooling supplied to said reference zone by said unit.

41. In the system as defined in claim 40 wherein said system controller means has a sixth program means for monitoring the temperature trend in said reference zone such that said system controller means will not provide an output signal to said unit for increasing the respective heating or cooling supplied to said reference zone when the temperature trend in said reference zone indicates that the demand in said reference zone is being substantially satisfied.

42. In the system as defined in claim 36 wherein said system controller means has a fifth program means such that when heating demand in the reference zone exceeds a first predetermined value during said third time period, said system controller means will provide an output signal to said unit for increasing the heating supplied to said reference zone by said unit.

43. In the system as defined in claim 42 wherein said system controller means has a sixth program means for monitoring the temperature trend in said reference zone such that said system controller means will not provide an output signal to said unit for increasing the heating supplied to said reference zone when the temperature trend in said reference zone indicates that the heating demand of said reference zone is being substantially satisfied.

44. In the system as defined in claim 34 wherein said system controller means has a fourth program means for selecting a reference zone in said second time period such that if the total number of first and second zone callers demanding cooling is equal to the total number of first and second zone callers demanding heating and each such number equals or exceeds the system mode demand number, said system controller means selects the heating or cooling mode coincident with the demand of said zone having the greatest demand, such zone being selected as a reference zone.

45. In the system as defined in claim 4 wherein said programmable system controller means includes at least one programmable slave system coordinator and a programmable master system coordinator, said slave system coordinator receiving information from said damper controller means, receiving information indicative of the condition of air in each said zone, and supplying such information to said master system coordinator, said master system coordinator operating said unit in accordance with its programming and the information received from said slave system coordinator to control said unit in the heating or cooling mode.

46. In the system as defined in claim 45 wherein said master system coordinator has a first program means such that the allowable operating mode of said unit is the cooling mode only during a first preselected time period, is the heating or cooling mode during a second preselected time period, and is the heating mode only during a third preselected time period.

47. In the system as defined in claim 46 wherein said master system coordinator determines the demand for heating or cooling from all said zones and the number of zones demanding heating or cooling during each said preselected time period by receiving such information from said slave system coordinator and compares such number with a preselected number defining the system mode demand number for operating said unit in a demanded allowable mode during a said preselected time period if the number of zones demanding an allowable mode equals or exceeds said system mode demand number.

48. In the system as defined in claim 47 further including at least one fan-powered mixing box controlled by a mixing box control means for supplying heated or cooled conditioned air to a plurality of second zones, said mixing box control means receiving information for determining the condition of the air in each said second zone and the demand for heating or cooling in all said second zones and selecting the heating or cooling mode of said fan-powered mixing box, said mixing box control means providing such information to said slave system coordinator.

49. In the system as defined in claim 48 wherein said master system coordinator has a second program means such that when said fan-powered mixing box is being operated in either the heating or cooling mode, the number of said second zones having a demand coincident with the mode of said fan-powered mixing box is provided to said slave system coordinator, said master system coordinator determining the total number of zones, including said second zones, demanding an allowable operating mode of said unit by receiving such information from said slave system coordinator and compares such number with said system mode demand number for operating said unit in a demanded allowable mode if the total number of zones demanding an allowable mode equals or exceeds said system mode demand number.

50. In the system as defined in claim 49 wherein said master system coordinator has third program means for determining the zone, including said second zones, having the greatest demand coincident with a selected allowable operating mode of said unit, said zone with the greatest demand being selected by said master system coordinator as a reference zone, said master system coordinator operating said unit in the selected mode until the demand in said reference zone is substantially satisfied.

51. In the system as defined in claim 50 wherein said master system coordinator has fourth program means such that when demand in said reference zone exceeds a first predetermined value, said master system coordinator will provide an output signal to said unit for increasing the heating or cooling being provided by said unit to said reference zone.

52. In the system as defined in claim 51 wherein said master system coordinator has fifth program means for monitoring the temperature trend in said reference zone such that said master system coordinator will not provide an output signal to said unit for increasing the heating or cooling supplied to said reference zone when the temperature trend in said zone indicates that the respective heating or cooling demand in said reference zone is being substantially satisfied.

53. In the system as defined in claim 46 wherein said master system coordinator has second program means for selecting the heating sources that are available in said second preselected time period, said heating sources selectable being the heating source of said unit, or said zone heating means, or said heating source of said unit and said zone heating means.

54. In the system as defined in claim 46 wherein said master system coordinator has second program means for selecting the heating sources that are available in said third preselected time period, said heating sources selectable being the heating source of said unit or the heating source of said unit and said zone heating means.

55. In the system as defined in claim 11 wherein said system controller means has first program means such that when said system controller receives a signal from said second sensor indicating outside air temperature is greater than a predetermined value established by said system controller means, said system controller will not activate the heating mode of said unit even if demand therefor is called for by any respective said zones.

56. In the system as defined in claim 1 further including at least one fan-powered mixing box assembly in a said secondary duct controlled by a mixing box control means for supplying heated or cooled conditioned air to a plurality of second zones, said mixing box control means receiving information for determining the condition of the air in each said second zone and the demand for heating or cooling in all said second zones and selecting the heating or cooling mode of said fan-powered mixing box, said system controller means receiving information from each said mixing box control means, said system controller means operating said unit in accordance with its programming, the condition of air in each zone and in accordance with information received from each damper controller means and each mixing box control means to control said unit in preselected allowable modes during distinct time periods.

57. In the system as defined in claim 1 wherein said programmable system controller means includes at least one programmable slave system coordinator and a programmable master system coordinator, said slave system coordinator receiving information from said damper controller means, receiving information indicative of the condition of air in each said zone, and supplying such information to said master system coordinator, said master system coordinator operating said unit in accordance with its programming and the information received from said slave system coordinator to control said unit in the heating or cooling mode.

58. A method for monitoring, controlling and coordinating the operation of a system which includes a central variable air volume heating and cooling unit for supplying heated or cooled conditioned air to a plurality of zones via duct dampers operated by respective damper control means wherein the system further includes at least one fan-powered mixing box operated by a mixing box control means and at least one zone having supplemental heating means controlled by the respective damper control means, wherein a programmable system controller means receives information from the damper control means and mixing box control means indicative of the condition of air in each zone and the operating mode of each fan-powered mixing box to operate the central unit in preselected allowable modes during distinct time periods, comprising the steps of:

A. determining by the system controller means the zone demand for heating or cooling from all damper control means;

B. determining by the system controller means the number of the zones having a demand for heating or cooling from all damper control means;

C. determining if any fan-powered mixing box is being operated in the heating or cooling mode and the demand of and number of zones associated with any operating mixing box that is demanding the selected mode of such mixing box;

D. selectively preselecting by the system controller means the number of zones having a demand for heating or cooling that is necessary to activate the central unit in an allowable mode;

E. comparing the numbers obtained from steps B and C by the system controller means and selecting the desired allowable mode when the total of the number of zones having a demand for heating or cooling, respectively, as obtained in steps B and C is equal to or greater than the number selected in step D;

F. activating the central unit by the system controller means in the selected mode until all zones demanding the selected mode have been satisfied;

G. deactivating the central unit by the system controller means; and

H. repeating steps A-G for the other mode when demand for the other mode has been selected in accord with steps A-E.

59. The method of claim 58 further comprising the step of:

I. comparing the number of demands after steps A-D and if the demands for heating and cooling are equal, and if both heating and cooling modes are allowable during the preselected time period, the central unit will be activated in step F in the mode coincident with the demand of the zone with the greatest demand.

60. The method of claim 58 wherein step F includes the step of:

I. choosing by the system controller means the zone demanding the selected mode as the reference zone and activating the central unit until the demand of the reference zone is substantially satisfied.

61. The method of claim 60 wherein step I further includes the step of:

J. selecting by the system controller means a second reference zone if the demand in a second zone is of the same mode and exceeds the demand in the reference zone selected in step I.

62. The method of claim 60 wherein step I further includes the step of:

J. monitoring by the system controller means the demand of the reference zone and increasing the heating or being supplied by the center unit if the demand in the reference zone exceeds a predetermined value established by the system controller means.

63. The method of claim 62 wherein step J further includes the step of:

K. monitoring by the system controller means of the temperature trend in the reference zone and not increasing the heating or cooling supplied by the unit if the temperature trend in the reference zone indicates that the demand of the reference zone is being substantially satisfied.

64. The method of claim 58 further including the steps of:

I. monitoring by the system controller means of the air temperature outside the system; and J. sending a signal from the system controller means to the damper control means to maintain associated zone supplemental heating sources OFF when outside air temperature is greater than a predetermined value established by the system controller means.

65. The method of claim 58 further including the steps of:

I. monitoring by the system controller means of the air temperature outside the system; and J. maintaining the heating mode of the central unit OFF by the system controller means when the air temperature outside the system is greater than a predetermined value established by the system controller means.

66. The method of claim 58 further comprising the steps of:

I. determining by the system controller means the real time; and

J. selecting the mode of operation of the central unit in step F in accordance with the programming of the system controller means such that the central unit is operated only in the cooling mode during a first time period; operated in either the heating or cooling mode during a second time period; and operated only in the heating mode during a third time period.

67. The method of claim 66 further comprising the step of:

K. preselecting the heating sources that are available in the second time period in accord with the programming of the system controller means such that (a) only the heating sources of the central unit are available; (b) both the central unit heating sources and the zone supplemental heating sources are available; or (c) only the zone supplemental heating sources are available.

68. The method of claim 66 further comprising the step of:

K. preselecting the heating sources that are available in the third time period in accord with the programming of the system controller means such that (a) only the heating sources of the central unit are available or (b) both the central unit heating sources and the zone supplemental heating sources are available.

69. A method for monitoring, controlling and coordinating the operation of a system which includes a central heating and cooling unit for supplying a plurality of zones with heated or cooled conditioned air via zone duct damper means controlled by respective damper control means wherein the system further includes at least one fan-powered mixing box operated by respective mixing box control means for supplying heated or cooled conditioned air to a group of the zones and further includes at least one zone having supplemental heating means operated by respective damper control means, wherein a programmable slave system coordinator receives information from the damper control means and the mixing box control means indicative of the condition of the air in each zone and operating mode of each fan-powered mixing box, and wherein a programmable master system coordinator receives such information from the programmable slave system coordinator to operate the central heating and cooling unit in preselected allowable modes during distinct time periods comprising the steps of:

- A. determining the zone demand for heating or cooling from all damper control means by the slave system coordinator;
- B. determining the number of zones having a demand for heating or cooling from all damper control means by the slave system coordinator;
- C. determining by the slave system coordinator if any fan-powered mixing box is being operated in the heating or cooling mode and the demand of and number of zones associated with an operating mixing box that are demanding the selected mode of such mixing box;
- D. selectively preselecting by the master system coordinator the total number of zones having a demand for heating or cooling that is necessary to activate the central unit in an allowable mode;
- E. comparing the numbers obtained from steps B and C by the master system coordinator and selecting the desired allowable mode when the total of the number of zones having a demand for heating or cooling respectively, as obtained in steps B and C is equal to or greater than the number selected in step D;
- F. activating the central unit by the master system coordinator in the selected mode until all zones demanding the selected mode have been satisfied;
- G. deactivating the central unit by the master system coordinator; and
- H. repeating steps A-G for the other mode when demand for the other mode has been selected in accord with steps A-E.

70. The method of claim 69 further comprising the step of:
- I. comparing the number of demands after steps A-D and if the demands for heating and cooling are equal, and if both heating and cooling modes are allowable during the preselected time period, the central unit will be activated in step F in the mode coincident with the demand of the zone with the greatest demand.

71. The method of claim 69 wherein step F includes the step of:
- I. choosing by the master system coordinator the zone demanding the selected mode as the reference zone and activating the central unit until the demand of the reference zone is substantially satisfied.

72. The method of claim 71 wherein step I further includes the step of:
- J. selecting by the master system coordinator a second reference zone if the demand in a second zone is of the same mode and if it exceeds the demand in the reference zone selected in step I.

73. The method of claim 71 wherein step I further includes the step of:
- J. monitoring by the master system coordinator the demand of the reference zone and increasing the heating or cooling being supplied by the central unit if the demand in the reference zone exceeds a predetermined value established by the master system coordinator.

74. The method of claim 73 wherein step J further includes the step of:
- K. monitoring by the master system coordinator of the temperature trend in the reference zone and not increasing the heating or cooling supplied by the unit if the temperature trend in the reference zone indicates that the demand of the reference zone is being substantially satisfied.

75. The method of claim 69 further including the steps of:
- I. monitoring by the master system coordinator of the air temperature outside the system; and
- J. sending a signal from the master system coordinator to the slave system coordinator and from the slave system coordinator to the damper control means to maintain associated zone supplemental heating sources OFF when outside air temperature is greater than a predetermined value established by the master system coordinator.

76. The method of claim 69 further comprising the steps of:
- I. determining by the master system coordinator the real time; and
- J. selecting the mode of operation of the central unit in step F in accordance with the programming of the master system coordinator such that the central unit is operated only in the cooling mode during a first time period; operated in either the heating or cooling mode during a second time period; and operated only in the heating mode during a third time period.

77. The method of claim 76 further comprising the step of:
- K. preselecting the heating sources that are available in the second time period in accord with the programming of the master system coordinator such that (a) only the heating sources of the central unit are available; (b) both the central unit heating sources and the zone supplemental heating sources are available; or (c) only the zone supplemental heating sources are available.

78. The method of claim 76 further comprising the step of:
- K. preselecting the heating sources that are available in the third time period in accord with the programming of the master system coordinator such that (a) only the heating sources of the central unit are available or (b) both the central unit heating sources and the zone supplemental heating sources are available.

79. In a system for monitoring and controlling the condition of air in each of a plurality of zones when using a unit having a fan to supply cooled conditioned air.,to each zone via a main duct and secondary ducts through a zone damper means in zone ducts communicating with each zone and operated by a damper control means, means for controlling and coordinating the operation of said unit with said damper control means and respective said zone damper means, said means comprising a programmable system controller means receiving information from each said damper controller means, said system controller means including program means such that said unit is operable only in preselected allowable modes during respective distinct time periods and inoperable in such preselected modes in other time periods, means for determining the condition of air in each said zone and supplying such information to said programmable system controller means, said system controller means operating said unit in accordance with its programming, the condition of air, in each zone and in accordance with information received from each damper controller means to control said unit in preselected allowable modes during said respective distinct time periods.

80. In the system as defined in claim 79 further including at least one fan-powered mixing box assembly in a said secondary duct controlled by a mixing box control means for supplying heated or cooled conditioned air to a plurality of second zones, said mixing box control means receiving information for determining the condition of the air in each said second zone and the demand for heating or cooling in all said second zones and selecting the heating or cooling mode of said fan-powered mixing box, said system controller means receiving information from each said mixing box control means, said system controller means operating said unit in accordance with its programming, the condition of air in each zone and in accordance with information received from each damper controller means and each mixing box control means to control said unit in preselected allowable modes during distinct time periods.

81. In the system as defined in claim 79 wherein said programmable system controller means includes at least one programmable slave system coordinator and a programmable master system coordinator, said slave system coordinator receiving information from said damper controller means, receiving information indicative of the condition of air in each said zone, and supplying such information to said master system coordinator, said master system coordinator operating said unit in accordance with its programming and the information received from said slave system coordinator to control said unit in the cooling mode.

82. A method for monitoring, controlling and coordinating the operation of a system which includes a central variable air volume heating and cooling unit for supplying heated or cooled conditioned air to a plurality of zones via duct dampers operated by respective damper control means, wherein a programmable system controller means, which includes selectable programs such that the central unit is operable only in preselected allowable heating or cooling modes during respective distinct time periods and inoperable in such preselected modes in other time periods, receives information from the damper control means indicative of the condition of air in each zone to operate the central unit only in the cooling mode during distinct time periods, when a program that allows only cooling has been selected for that respective time period, comprising the steps of:

A. determining by the system controller means the zone demand for cooling from all damper control means;

B. determining by the system controller means the number of the zones having a demand for cooling from all damper control means;

C. selectively preselecting by the system controller means the number of zones having a demand for cooling that is necessary to activate the central unit in a cooling mode;

D. comparing the numbers obtained from steps B and C by the system controller means and selecting the desired allowable mode when the total of the number of zones having a demand for cooling, as obtained in step B is equal to or greater than the number selected in step C;

E. activating the central unit by the system controller means in the cooling mode until all zones demanding the selected mode have bene satisfied; and F. deactivating the central unit by the system controller means.

83. The method of claim 82 wherein the system further includes a central variable air volume unit having heating for supplying heated conditioned air to a plurality of zones via duct dampers operated by respective damper control means, wherein a programmable system controller means receives information from the damper control means indicative of the condition of air in each zone to operate the central unit only in preselected allowable modes during respective distinct time periods and a program that allows heating and cooling has been selected for a respective time period, further comprising the steps of:

G. determining by the system controller means the zone demand for heating or cooling from all damper control means;

H. determining by the system controller means the number of the zones having a demand for heating or cooling from all damper control means;

I. selectively preselecting by the system controller means the number of zones having a demand for heating or cooling that is necessary to activate the central unit in an allowable mode;

J. comparing the numbers obtained from steps H and I by the system controller means and selecting the desired allowable mode then the total of the number of zones having a demand for heating or cooling, respectively, as obtained in step H is equal to or greater than the number selected in step I;

K. activating the central unit by the system controller means in the selected mode until all zones demanding the selected mode have been satisfied;

L. deactivating the central unit by the system controller means; and

M. repeating steps G-K for the other mode when demand for the other mode has been selected in accord with steps G-J.

84. The method of claim 83 wherein the system further includes at least one fan-powered mixing box operated by a mixing box control means, wherein a programmable system controller means receives information from the damper control means and mixing box control means indicative of the condition of air in each zone and the operating mode of each fan-powered mixing box to operate the central unit in preselected allowable modes during distinct time periods, further comprising the steps of:

N. determining if any fan-powered mixing box is being operated in the heating or cooling mode and the demand of and number of zones associated with any operating mixing box that is demanding the selected mode of such mixing box;

O. comparing the numbers obtained from steps H, I and N by the system controller means and selecting the desired allowable mode when the total of the number of zones having a demand for heating or cooling, respectively, as obtained in steps H and N is equal to or greater than the number selected in step I;

P. activating the central unit by the system controller means in the selected mode until all zones demanding the selected mode have been satisfied;

Q. deactivating the central unit by the system controller means; and

R. repeating steps G-Q for the other mode when demand for the other mode has been selected in accord with steps G-O.

* * * * *